(12) United States Patent
Richley et al.

(10) Patent No.: US 10,103,975 B2
(45) Date of Patent: Oct. 16, 2018

(54) METHODS AND APPARATUS TO MITIGATE INTERFERENCE AND TO EXTEND FIELD OF VIEW IN ULTRA-WIDEBAND SYSTEMS

(71) Applicant: ZIH CORP., Lincolnshire, IL (US)

(72) Inventors: Edward A. Richley, Gaithersburg, MD (US); Aitan Ameti, Rockville, MD (US)

(73) Assignee: ZIH Corp., Lincolnshire, IL (US)

( * ) Notice: Subject to any disclaimer, the term of this patent is extended or adjusted under 35 U.S.C. 154(b) by 45 days.

(21) Appl. No.: 15/246,863

(22) Filed: Aug. 25, 2016

(65) Prior Publication Data

US 2018/0062981 A1    Mar. 1, 2018

(51) Int. Cl.
| | |
|---|---|
| H04L 12/725 | (2013.01) |
| H04L 12/26 | (2006.01) |
| H04W 72/08 | (2009.01) |
| H04B 1/06 | (2006.01) |

(52) U.S. Cl.
CPC ......... H04L 45/3065 (2013.01); H04B 1/06 (2013.01); H04L 43/106 (2013.01); H04L 43/16 (2013.01); H04W 72/082 (2013.01)

(58) Field of Classification Search
CPC ... H04L 45/3065; H04L 43/106; H04L 43/16; H04W 72/082
See application file for complete search history.

(56) References Cited

U.S. PATENT DOCUMENTS

| | | | |
|---|---|---|---|
| 5,046,133 A | 9/1991 | Watanabe et al. | |
| 6,434,187 B1 * | 8/2002 | Beard | H04B 1/403 |
| | | | 332/128 |
| 6,834,073 B1 | 12/2004 | Miller et al. | |
| 7,436,908 B2 * | 10/2008 | You | H04B 1/719 |
| | | | 375/340 |
| 8,786,495 B2 * | 7/2014 | Wisherd | G01S 5/0221 |
| | | | 342/465 |

(Continued)

FOREIGN PATENT DOCUMENTS

| | | |
|---|---|---|
| WO | 2007/127040 A1 | 11/2007 |
| WO | 2015/186044 A1 | 12/2015 |

OTHER PUBLICATIONS

Office Action for GB Patent Application No. 1710853.1 dated Dec. 15, 2017.

*Primary Examiner* — Wutchung Chu

(57) ABSTRACT

Methods and systems are described for generating a first filtered signal by passing signal energy in a first radio frequency (RF) spectral band associated with a signaling bandwidth of an ultra-wideband (UWB) RF signaling system, generating a second filtered signal by passing signal energy in a second RF spectral band associated with the signaling bandwidth of the UWB RF signaling system, generating a plurality of digitized streams of pulses by identifying RF pulses in a respective filtered signal above a respective predetermined threshold, generating at least one time-stamped tag data packet, based on decoding a valid over-the-air packet corresponding to a plurality of RF pulses received according to a known burst pattern, selecting a time-stamped tag data packet from the at least one received time-stamped tag data packet, formulating a network data packet based on the selected time-stamped tag data packet, and outputting the network data packet.

20 Claims, 15 Drawing Sheets

(56) References Cited

U.S. PATENT DOCUMENTS

| | | | |
|---|---|---|---|
| 9,180,357 B2 * | 11/2015 | Richley | G06K 7/10227 |
| 9,571,143 B2 * | 2/2017 | Richley | G06K 7/10227 |
| 9,699,278 B2 * | 7/2017 | Richley | H04L 43/04 |
| 9,715,005 B2 * | 7/2017 | Hughes | G01S 5/0284 |
| 2003/0016174 A1 * | 1/2003 | Anderson | G01S 5/02 |
| | | | 342/378 |
| 2004/0258133 A1 * | 12/2004 | Lee | H04B 1/719 |
| | | | 375/130 |
| 2005/0265428 A1 | 12/2005 | McCorkle | |
| 2006/0244653 A1 * | 11/2006 | Szajnowski | G01S 7/282 |
| | | | 342/70 |
| 2007/0076813 A1 | 4/2007 | Haartsen | |
| 2015/0148129 A1 * | 5/2015 | Austerlade | H04L 43/04 |
| | | | 463/31 |
| 2015/0149837 A1 * | 5/2015 | Alonso | G06K 7/10227 |
| | | | 714/57 |
| 2015/0355311 A1 * | 12/2015 | O'Hagan | G01S 5/021 |
| | | | 340/539.13 |
| 2015/0358771 A1 | 12/2015 | Richley et al. | |
| 2015/0358852 A1 * | 12/2015 | Richley | H04W 28/0226 |
| | | | 370/328 |
| 2015/0358938 A1 * | 12/2015 | Richley | H04W 64/006 |
| | | | 455/456.1 |
| 2016/0154087 A1 * | 6/2016 | Boyd | G01S 5/0205 |
| | | | 342/463 |

* cited by examiner

METHODS AND APPARATUS TO MITIGATE INTERFERENCE AND TO EXTEND FIELD OF VIEW IN ULTRA-WIDEBAND SYSTEMS

BACKGROUND

In some real-time location systems (RTLS), radio-frequency identification (RFID) tags are mounted to objects. The RFID tags transmit data to a plurality of receivers. The transmissions are processed to determine locations of the objects.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the described embodiments, and explain various principles and advantages of those embodiments.

Figure 1:
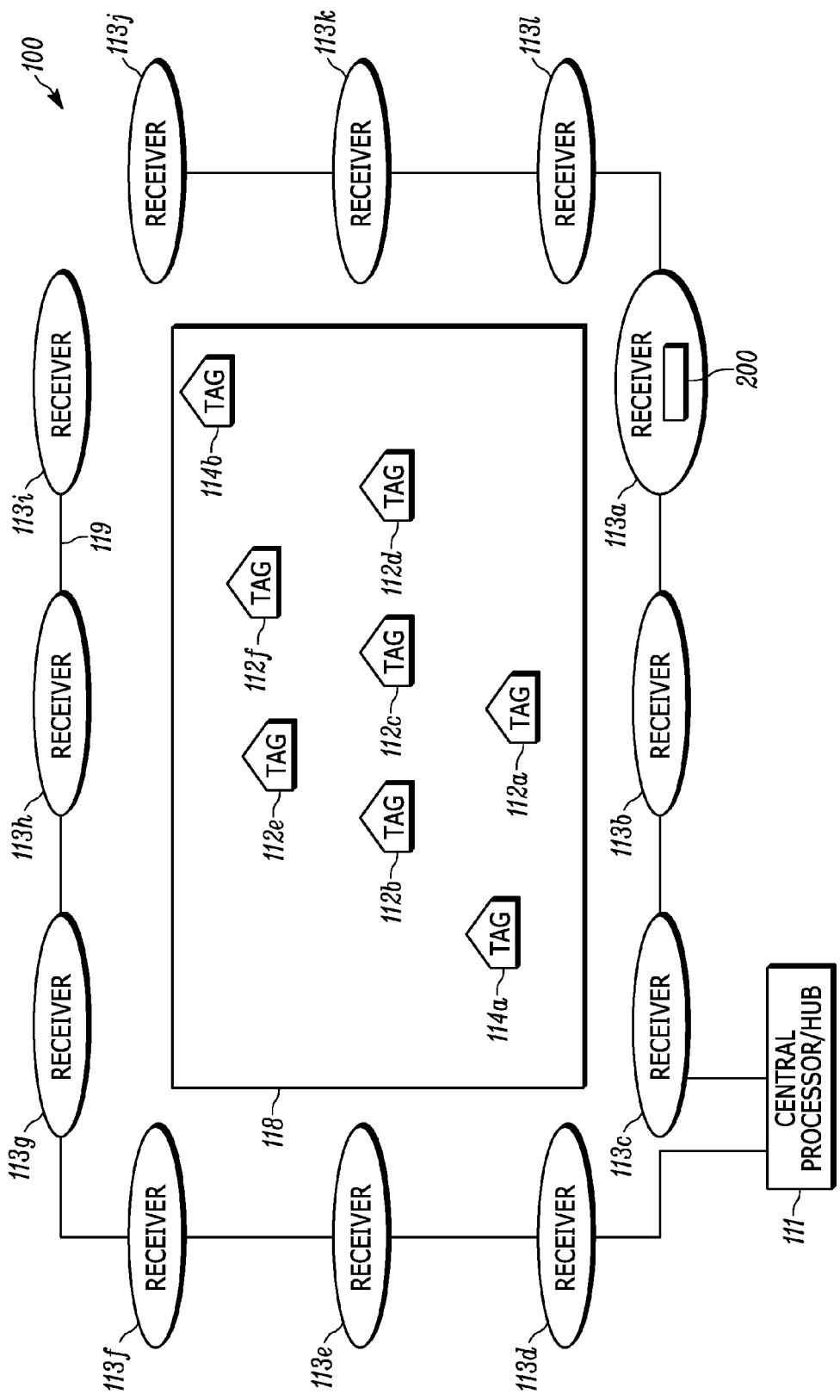
FIG. 1 illustrates an example locating system in which examples disclosed herein may be implemented.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments.

The apparatus and method components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

DETAILED DESCRIPTION

Before proceeding with this detailed description, it is noted that the entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—can only properly be read as being constructively preceded by a clause such as "In at least one embodiment, . . . " or "In at least one example, . . . ." And it is for reasons akin to brevity and clarity of presentation that this implied leading clause is not repeated ad nauseum in this detailed description.

Moreover, any of the variations and permutations described herein can be implemented with respect to any embodiments, including with respect to any method embodiments and with respect to any system embodiments. Furthermore, this flexibility and cross-applicability of embodiments is present in spite of the use of slightly different language (e.g., process, method, steps, functions, set of functions, and the like) to describe and or characterize such embodiments.

Real-time location systems (RTLS) are becoming increasingly popular, especially in sporting venues (e.g., football stadiums) for tracking players. In some RTLS, football players, for example, wear radio-frequency identification (RFID) tags that periodically send out over-the-air packets as consecutive ultra-wideband (UWB) radio frequency (RF) pulses. The RF pulses may be detected using detectors that compare received signal energy against a respective threshold level, to detect if a pulse is present. These UWB RF pulses often have a very wide bandwidth, approximately in the 6.35-6.75 Gigahertz (GHz) range. However, many mobile devices operate in a range of approximately 6.425-6.525 GHz. Examples of such mobile devices may include mobile video cameras. Further, it should be noted that this particular band may also be reserved for licensed operators, TV, or police. For example, services are authorized to use 6.425 to 6.525 GHz for mobile use under FCC parts 101.603, 74.602, 78.103, and fixed operations under 101.803. Systems described below may be configured to reject interference by simultaneously processing multiple RF signal paths using filters of varying RF spectral bands.

Disclosed herein are example apparatuses, systems and methods for detecting, for example, UWB transmissions using transceivers having parallel RF signal processing paths. As disclosed herein, each signal path may be processed differently so as to provide combined signal processing that results in improved detection of, for example, UWB transmissions, through wider antenna coverage, enhanced noise reduction, or both.

To achieve the improved detection of transmissions, examples disclosed herein process each separate RF path with bandpass filters having respective bandwidths. In some examples, a given filter may have a relatively narrower bandwidth that attenuates signal energy in the known frequency band of an interfering system, such as the video cameras described above. In such examples, the RF signal processing path having a relatively narrower bandwidth may perform better than a full bandwidth filter in the presence of a known interfering system. In particular, the narrow bandwidth filter is preconfigured to remove signal energy at frequencies (e.g., 6.425-6.525 GHz) associated with the interfering system. Further, overlapping filter bands allows for high sensitivity in the absence of interference, as well as minimally reduced sensitivity in the presence of interference.

In some examples, each RF signal processing path has a wide bandwidth filter, covering approximately all of a spectral band of pulses emitted from the RFID tag, and each wide bandwidth filter receives signals from separate antennas. In such examples, a wider field-of-view is attainable, and an arbiter selects signals from one of the two wide bandwidth filters. It should be noted that such systems may be used in scenarios where there is no significant interference from the known interfering system.

In some examples, at least two RF signal processing paths have relatively narrow bandwidth filters, which may have a bandwidth of approximately 100-200 MHz as opposed to a relatively wider bandwidth of approximately 400 MHz wide. One of the narrow bandwidth filters may have a spectral band between 6.35-6.525 GHz while the other narrow bandwidth filter has a spectral band between 6.55-6.75 GHz. Such examples may be useful if the interfering signal energy from the interfering system varies over time. In some scenarios, a system may operate in a given band of a plurality of available bands, which may be determined on "game day," for example, in which case an example using non-overlapping filters (or partially overlapping filters) may continue to clearly process the received bursts from the RFID tags.

In some examples, each of the bandpass filters is used to provide filtered signals to one or more detectors, which may be two-input comparators, for example, wherein the comparators are configured with appropriate thresholds for detecting UWB pulses. Packet decoders may then analyze a digitized stream of pulses from the comparator outputs to identify valid over-the-air packets prior to forwarding time-stamped tag data packets that include information such as a tag identification, a burst identification, and a time stamp corresponding to when the over-the-air packet was received.

As described above, examples disclosed herein may provide numerous improvements over existing systems, such as mitigating interference in the presence of an interfering system. In some examples, if an interfering system is not present, a wider field of view may be attainable through the simultaneous processing of filtered signals received from additional antennas. Further, when using filters having different spectral bands, a wider bandwidth is available in the absence of interference, and a narrower bandwidth is available in the presence of interference. If interference is intermittent, it may be beneficial to overlap the spectral bands of the filters.

FIG. 1 is an exemplary RTLS, in accordance with some embodiments. As described in detail below in connection with FIGS. 7 and 8, the RTLS of FIG. 1 includes RTLS tags 112*a-f* that transmit blink data (e.g., UWB transmissions) and receivers 113*a-l* configured to receive the blink data. As described in detail below in connection with FIGS. 2, 7-11, the receivers 113*a-l* convey information associated with the blink data (e.g., time measurements, signal measurements, and the blink data) to a central processor/hub 111, which identifies locations of the corresponding RTLS tags 112*a-f*. It should be noted that the blink data and information associated with the blink data may take the form of a network data packet that is formulated based on a time-stamped tag data packet.

Figure 2:
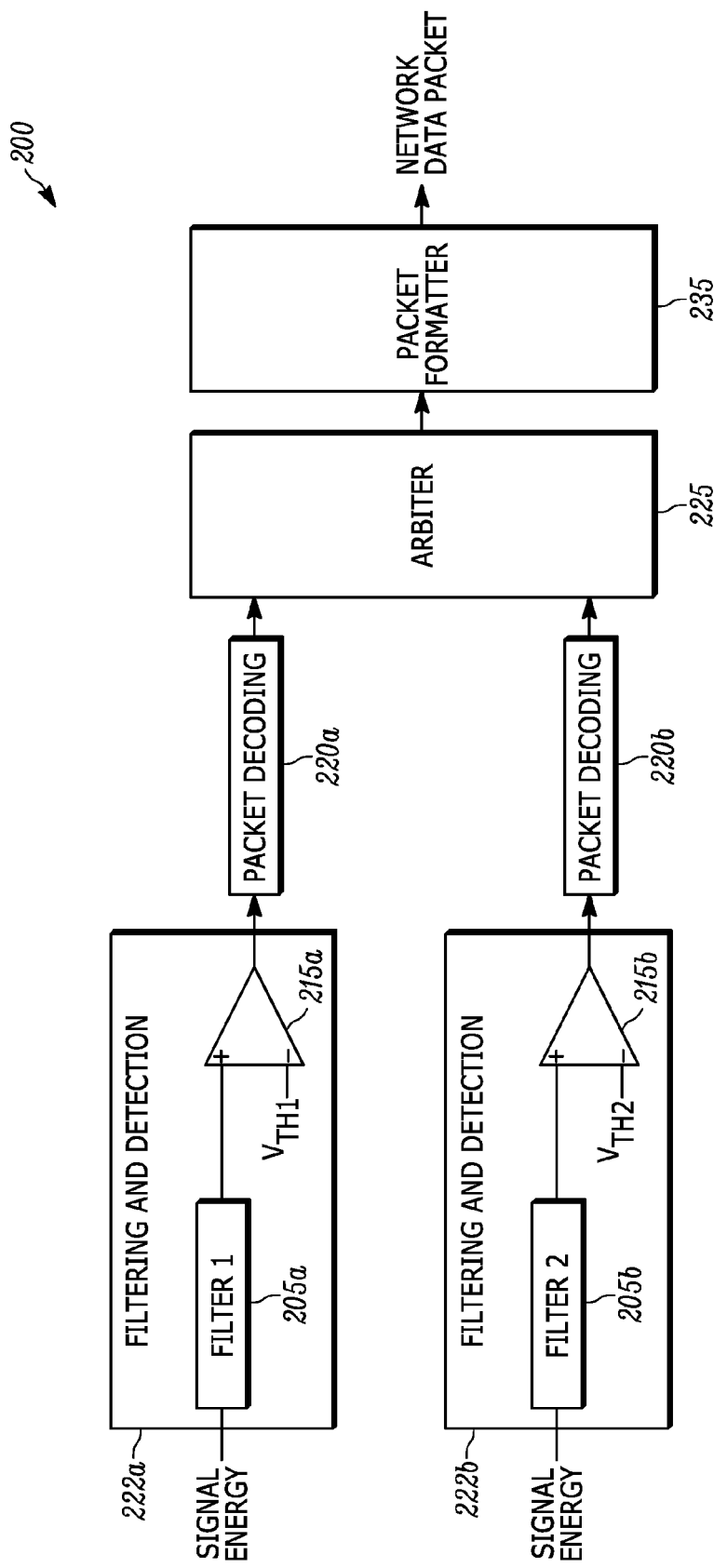
FIG. 2 is a block diagram representative of an example multipath signal processor (MSP) constructed in accordance with teachings of this disclosure.

In the illustrated example of FIG. 1, one or more of the receivers 113*a-l* implements a multipath signal processor (MSP) 200 constructed in accordance with teachings of this disclosure. In FIG. 1, receiver 113*a* is shown to include an MSP 200, however it should be noted that any combination of receivers 113*a-l* may include MSPs 200. The example MSP 200 is configured to implement parallel processing of multiple RF signal processing paths to mitigate interference and provide broader coverage. FIG. 2 is a block diagram illustrating an example implementation of the MSP 200.

The example MSP 200 of FIG. 2 includes a first filtering and detection module 222*a* and a second filtering and detection module 222*b*. The first filtering and detection module 222*a* includes a first filter 205*a* and the second filtering and detection module 222*b* includes a second filter 205*b*. Further, the first filtering and detection module 222*a* includes a first detector 215*a* and the second filtering and detection module 222*b* includes a second detector 215*b*. In the example of FIG. 2, the first and second detectors 215*a* and 215*b* are shown as comparators, however additional or alternative detection components may be employed. For simplicity, components of known RF receivers (square-law demodulators, amplifiers, etc.) are not shown, but may be included in the filter and detection blocks 222*a-b*. The example MSP 200 of FIG. 2 includes first and second packet decoders 220*a* and 220*b*, respectively. The example first and second decoders 220*a* and 220*b* are in communication with the first and second detectors 215*a* and 215*b*, respectively. In the example of FIG. 2, the first and second packet decoders 220*a* and 220*b* are coupled to an arbiter 225, which outputs a selected time-stamped tag data packet to packet formatter 235 for network data packet generation.

While the example MSP 200 of FIG. 2 includes two (2) filtering and detection modules 222*a-b*, examples disclosed herein may include any suitable number (e.g., three (3)) of filtering and detection modules, as well as any suitable number of corresponding packet decoders 220.

In the illustrated example of FIG. 2, the first filter 205*a* is configured to pass first signal energy in a first RF spectral band associated with a signaling bandwidth of an UWB RF signaling system, and to output a first filtered signal. The second filter 205*b* is configured to pass second signal energy in a second RF spectral band associated with the signaling bandwidth of the UWB RF signaling system, and to output a second filtered signal. In some embodiments, the first signal energy is received from a first antenna and the second signal energy is received from a second antenna. Such embodiments may provide a wider field of view. Alternatively, the first signal energy and the second signal energy are received from a common antenna.

Figure 3:
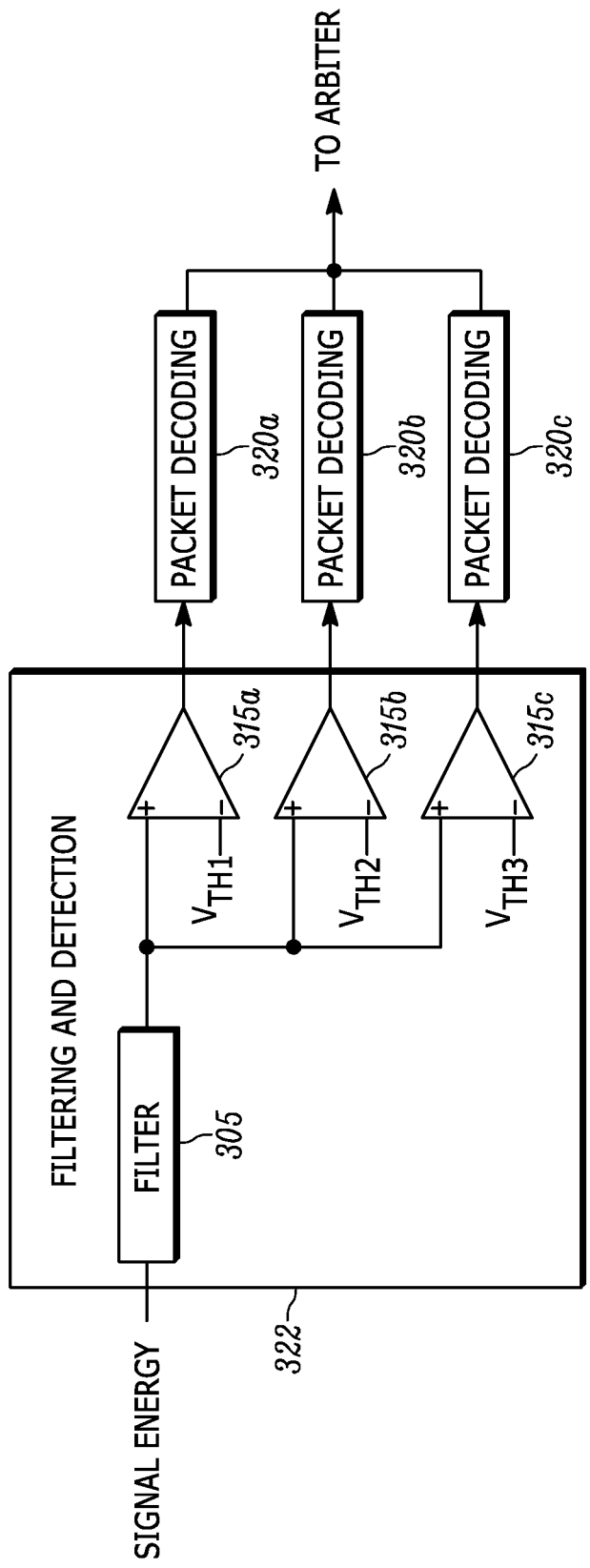
FIG. 3 is a block diagram representative of an example multi-detector filtering and detection module constructed in accordance with teachings of this disclosure.

The first and second detectors 215*a* and 215*b* receive the first and second filtered signals, respectively. Each of the first and second detectors 215*a* and 215*b* outputs a digitized stream of pulses by identifying pulses in the corresponding filtered signal that are above a respective predetermined threshold $V_{TH}$. In some examples, a given detector may compare the respective received filtered signals against various thresholds, as described in connection with FIG. 3. FIG. 3 illustrates a multi-detector filter and detection block 322, in accordance with some embodiments. The system shown in FIG. 3 may represent filtering and detection block 222*a* for example, having three detectors 315*a-c*, each processing the same filtered analog signal received from filter 305, connected to three packet decoding circuits 220 (shown as packet decoding circuits 320a-c in FIG. 3). As shown, each detector 315a-c has a respective unique threshold $V_{TH1}$, $V_{TH2}$, and $V_{TH3}$. Each threshold may be tuned for various SNR characteristics; for example, $V_{TH1}$ may be sensitive in detecting low-amplitude signals, but more erroneous (producing more false-positives), while $V_{TH2}$ may be higher than $V_{TH1}$, produce fewer false-positives, but more accurately detecting larger magnitude signals. FIG. 3 includes three parallel detection and packet decoding paths, however it should be noted that this should not be considered limiting, and any number of parallel detection and packet-decoding paths may be included.

In such embodiments, the threshold value has tradeoffs between signal-to-noise ratio (SNR) and sensitivity. For example, detectors 315a and 315b having thresholds $V_{TH1}$ and $V_{TH2}$ respectively, where $V_{TH1} < V_{TH2}$, detector 315a may provide a higher sensitivity, at the cost of more false positive comparator "hits". Alternatively, detector 315b may provide higher SNR, while having the tradeoff that some pulses may be missed. As each detector is processing the filtered signal received from filter 305, the arbiter will select the first time-stamped tag data packet available from packet decoders 320a-c.

Each of the first and second packet decoders 220a and 220b is configured to receive a respective one of the digitized streams of pulses and to decode a valid over-the-air packet corresponding to a plurality of RF pulses received according to a known burst pattern. Additionally, each of the first and second packet decoders 220a and 220b is configured to generate a respective time-stamped tag data packet including (i) information in the valid over-the-air packet and (ii) a corresponding timestamp. In some embodiments, the corresponding time stamp represents an average of counter values in the respective receiver for a plurality of detected RF pulses.

In the example of FIG. 2, the arbiter 225 is configured to receive at least one time-stamped tag data packet from at least one of the first and second packet decoders 220a and 220b, and to select a time-stamped tag data packet from the at least one received time-stamped tag data packet. In some examples, the arbiter simply selects the first time-stamped tag data packet it receives. In scenarios where the first filter 205a has a wide bandwidth and the second filter 205b has a narrow bandwidth, the signal filtered by the first detector 205a will arrive at the corresponding detector 215a before the signal filtered by the second filter 205b, due to a group delay introduced to the second filtered signal as a result of the second filter 205a having a narrow bandwidth. Thus, in the scenario where there is no interference, packet decoder 220a will produce a time-stamped tag data packet to arbiter 225 before packet decoder 220b. In the scenario where interference is present, packet decoder 220a may not identify any valid over-the-air packets, and the arbiter will select the time-stamped tag data packet from packet decoder 220b, operating on the narrowly filtered signal. In order to prevent the group delay introduced by the narrow filter, the amount of group delay can be calculated and compensated for. For example, during final testing of a given MSP, time stamps can be obtained for inputs into the first and second filters, and an average time difference (e.g., the group delay value), can be obtained, and stored in memory to a resolution of ⅛ of a nanosecond. This is possible as a time-of-arrival (TOA) circuit uses eight (8) samples to figure out the fine time of a 1 nanosecond resolution. When normal production code is running, the difference value may be entered into the fine time calculation of the slower side, making it as if the packet appeared faster than it really did. Thus, the difference in timestamps of widely and narrowly filters is very small, and switching between inputs is transparent. Further, the central hub 111 will continue to calculate accurate locations, regardless of which input was selected using arbiter 225.

In some examples, the arbiter 225 is configured to send a reset command to at least one of the first and second packet decoders 220a and 220b in response to the selection of the time-stamped tag data packet. In some embodiments, the arbiter 225 is configured to send the reset command to the one of the packet decoders 220a and 220b that is associated with the selected time-stamped tag data packet, so that the packet decoders may begin decoding a new packet from a different RFID tag, or a subsequent packet from the same RFID tag, for example. In some embodiments, the arbiter 225 is configured to send the reset command to all of the packet decoders, in case any packet decoders are in the process of decoding a duplicate packet. In some embodiments, the arbiter 225 is configured to send the clear command to any of the packet decoders 220 receiving the respective filtered signal associated with the selected time-stamped tag data packet. In the above examples, the arbiter avoids selecting the same time-stamped tag data packet (e.g., same tag ID, burst ID, etc.) that may have been simultaneously decoded in two parallel RF signal processing paths.

In some embodiments, the arbiter 225 is further configured to determine whether the selected time-stamped tag data packet is a duplicate of at least one stored time-stamped tag data packet. In such instances, packet formatter 235 may be configured to generate and to output a network data packet corresponding to the selected time-stamped tag data packet if the time-stamped tag data packet is not a duplicate, as the central hub for calculating position may only use one timestamp for a given packet from a given RFID tag. In such examples, the arbiter may hold onto previously received time-stamped tag data packets, and may check (e.g., tag ID, burst ID) of incoming time-stamped tag data packets against the previously received time-stamped tag data packets. If the incoming time-stamped tag data packet is a duplicate of a previously received time-stamped tag data packet, then the arbiter discards the duplicate. The amount of time each previously received time-stamped tag data packet is retained may vary depending on application. In such examples, a plurality of registers or a more sophisticated memory device may be used to retain the previously received time-stamped tag data packets, as would be known to those of skill in the art.

In the example of FIG. 2, the packet formatter 235 is configured to formulate a network data packet based on the selected time-stamped tag data packet, and to output the network data packet.

In some embodiments, the first filter 205a has a RF spectral band of approximately all of the signaling bandwidth of the UWB RF signaling system, and the second filter 205b has a RF spectral band covering a portion of the RF spectral band of the first filter 205a, the RF spectral band of the second filter attenuating signal energy in a RF spectral band of a known interfering system. In such embodiments, in the presence of interference, the signal being filtered by filter 205a and presented to detector 215a may be interfered with, and packet decoder 220a may not detect a valid over-the-air packet. Meanwhile filter 205b is processing the signal received from the antenna, and is filtering out any interference provided by the known interfering system. Detector 215b then provides a digitized stream of pulses to packet decoder 220b, which may then decode a valid over-the-air packet, and create a time-stamped tag data packet to provide to arbiter 225.

Figure 4:
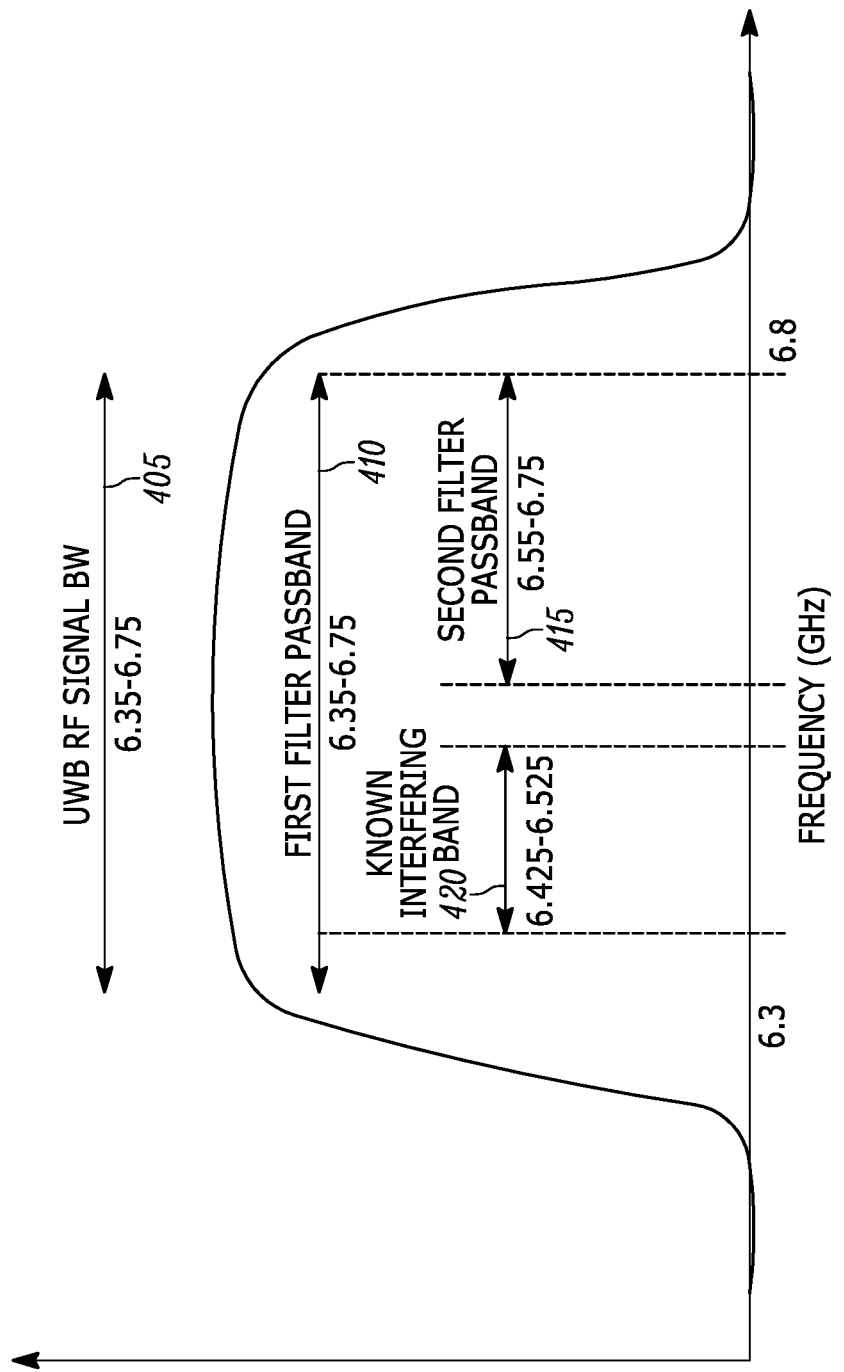
FIG. 4 is a frequency spectrum illustrating overlapping filter bandwidths.

FIG. 4 is a diagram of a frequency spectrum of a UWB RF signaling system, in accordance with some embodiments. As shown, a signaling bandwidth 405 of the UWB RF signaling system spans approximately 6.35-6.75 GHz, however this should not be considered limiting. In some embodiments, as shown in FIG. 4, the first filter 205a has a passband 410 of approximately all of the signaling BW of the UWB RF signaling system, while the second filter 205b has a passband 415 covering a portion of the first filter 205a. As shown, the passband 415 of the second filter 205b lies outside of a known interfering band 420. In some embodiments, the known interfering band 420 may be associated with known RF bands of common interfering devices, such as mobile video cameras. As shown, the known interfering band 420 spans approximately from 6.425 GHz to 6.525 GHz, while the second filter passband 415 spans approximately from 6.55 GHz to 6.75 GHz, thus attenuating any signal energy present from any present interferers.

In some embodiments, the first and the second filters have non-overlapping RF spectral bands, the RF spectral bands of the first and second filters collectively making up approximately all of the signaling bandwidth of UWB RF signaling system. Such embodiments may reject interfering systems that have varying spectral bands, or one of a plurality of interfering systems each having different spectral bands (e.g., mobile phones, radios, etc).

Figure 5:
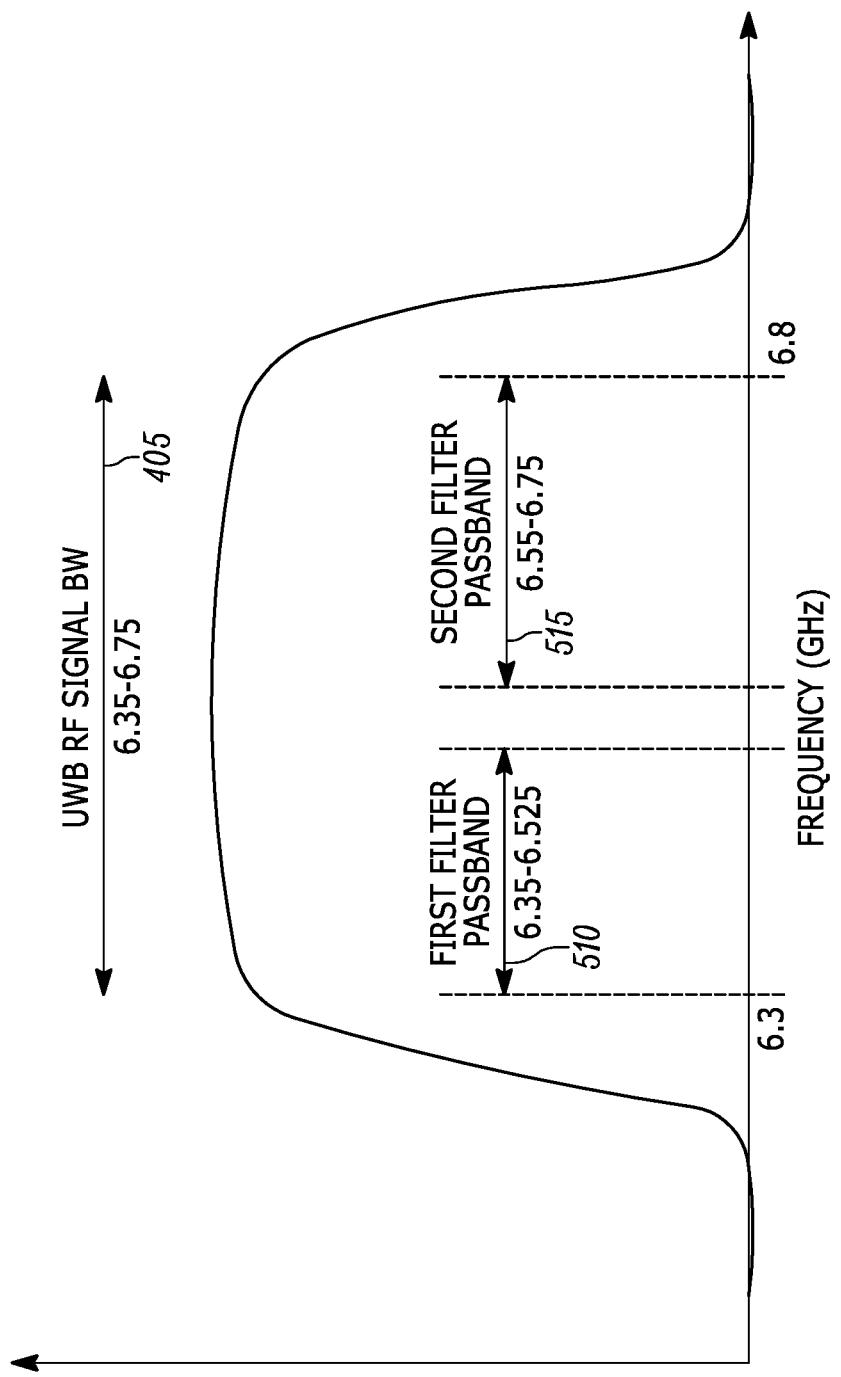
FIG. 5 is a frequency spectrum illustrating non-overlapping filter bandwidths.

FIG. 5 illustrates an alternative embodiment for passbands of the first filter 205a and the second filter 205b. As shown, the first and second filters 205a and 205b have narrow, non-overlapping passbands 510 and 515, respectively. Specifically, first filter 205a has a RF spectral band 510 of approximately 6.35 GHz to 6.525 GHz, and second filter 205b has a RF spectral band 515 of approximately 6.55 GHz to 6.75 GHz. In such embodiments, the known interfering band may move about the signaling BW of the UWB RF signaling system throughout a given period of time. Thus, if the known interfering band occupies a region associated with the passband of the first filter 205a, the second filter 205b may provide a clear received signal from RF tags, and vice versa.

Figure 6:
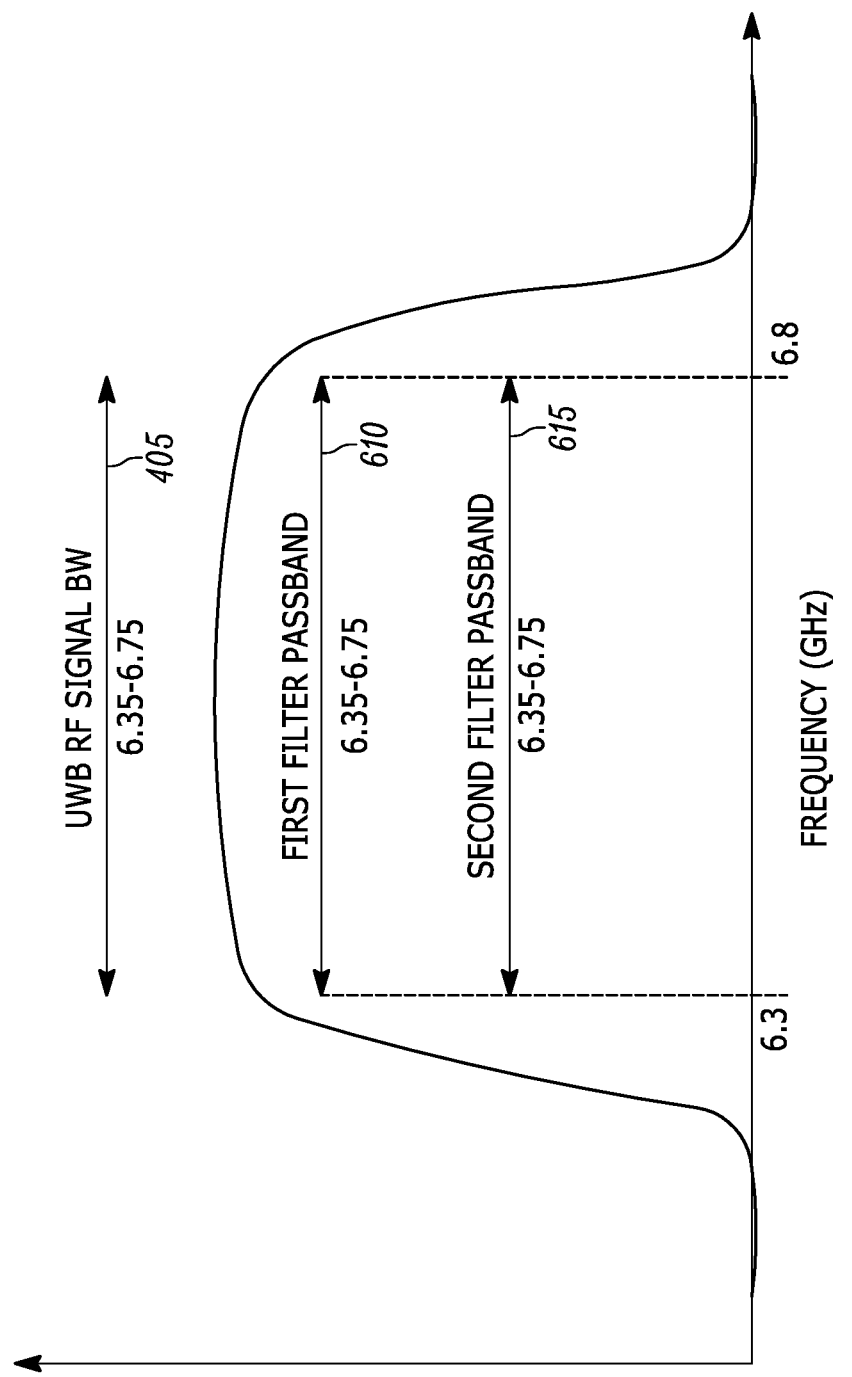
FIG. 6 is a frequency spectrum illustrating overlapping filter bandwidths.

In some embodiments, the first and second filters 205a and 205b have RF spectral bands over approximately all of the signaling bandwidth of the UWB RF signaling system. In such embodiments, the MSP 200 may be configured to provide a wider field of view by connecting each filter to different antennas. In the absence of any interference, each signal may be processed accurately, and the arbiter 225 would continue to select the first received time-stamped tag data packet for transmission to the central hub. FIG. 6 is a frequency spectrum illustrating such an embodiments having overlapping spectral bands. As shown in FIG. 6, the first filter 205a and second filter 205b have passbands 610 and 615, respectively, each spanning approximately all of the signaling BW of the UWB RF signaling system (~6.35 GHz to 6.75 GHz). Such embodiments may be advantageous when each filter is connected to a respective antenna, as the use of two (or possibly more) antennas provides a wider effective field of view, which using the same architecture as previously described produces what may be known as a diversity receiver.

FIG. 1 illustrates an example locating system 100 in which methods and apparatus to mitigate interference and/or extend a field of view may be implemented, using the MSPs 200 as described above. The example location system 100 of FIG. 1 calculates a location of an object by an accumulation, at a central processor/hub 111, of location data or time of arrivals (TOAs) associated with the object. In the example locating system 100 of FIG. 1, the TOAs represent a relative time of flight (TOF) from real-time location service (RTLS) tags 112a-f as recorded at one or more of a plurality of receivers 113a-l (e.g., UWB readers). Receivers 113a-l may include the components described above with respect to MSPs 200, as well as various additional components. A timing reference clock is used, in some examples, such that at least a subset of the receivers 113a-l may be synchronized in frequency, whereby the relative TOA data associated with each of the RTLS tags 112a-f may be registered by a counter associated with at least a subset of the receivers 113a-l. In some examples, a reference tag 114a-b (e.g., a UWB transmitter) positioned at known coordinates, is used to determine an offset between the counters associated with at least a subset of the of the receivers 113a-l. In the example of FIG. 1, the RTLS tags 112a-f and the reference tags 114a-b reside in an active RTLS field 118. The systems described herein may be referred to as either "multilateration" or "geolocation" systems, terms that refer to the process of locating a signal source by solving an error minimization function of a location estimate determined by the difference in time of arrival (DTOA) between TOA signals received at multiple ones of the receivers 113a-l.

In some examples, the locating system 100 including at least the tags 112a-f and the receivers 113a-l is configured to provide two dimensional and/or three dimensional precision localization (e.g., subfoot resolutions), even in the presence of multipath interference, due in part to the use of short (e.g., nanosecond) duration pulses, the TOF of which can be accurately determined using detection circuitry, such as in the receivers 113a-l. In some examples, the receivers 113a-l trigger on the leading edge of a received waveform. In some examples, the short pulse characteristic of the pulses allows data to be conveyed by the system at a higher peak power, but lower average power levels, than a wireless system configured for high data rate communications, yet still operate within local regulatory requirements.

In some examples, to provide a preferred performance level while complying with the overlap of regulatory restrictions (e.g., FCC and ETSI regulations), the tags 112a-f may operate with an instantaneous −3 dB bandwidth of approximately four hundred (400) megahertz (MHz) and an average transmission below one-hundred eighty-seven (187) pulses in a one (1) millisecond (msec) interval, provided that the rate is sufficiently low. In such examples, the predicted maximum range of the system, operating with a center frequency of 6.55 gigahertz (GHz), is roughly two-hundred (200) meters in instances in which a twelve (12) dbi directional antenna is used at the receiver, but the projected range will depend, in other examples, on receiver antenna gain. Alternatively or additionally, the range of the system allows for one or more tags 112a-f to be detected with one or more receivers positioned throughout a football stadium used in a professional football context. Such a configuration advantageously satisfies constraints applied by regulatory bodies related to peak and average power densities (e.g., effective isotropic radiated power density ("EIRP")), while still optimizing system performance related to range and interference. In some examples, tag transmissions with a −3 dB bandwidth of approximately four hundred (400) MHz yields an instantaneous pulse width of roughly two (2) nanoseconds (nsec) that enables a location resolution to better than thirty (30) centimeters (cm).

In the illustrated example of FIG. 1, the object to be located carries a tag 112a-f (e.g., a tag having a UWB transmitter). The object carries the tag 112a-f via, for example, an attachment of the tag 112a-f to the object, adhering the tag 112a-f to the object, inserting the tag 112a-f into an article associated with the object such as clothing or shoulder pads and/or any other suitable manner of carrying. In the example of FIG. 1, the tag 112a-f transmits a burst pattern (e.g., multiple pulses at a one (1) megabits per second (Mb/s) burst rate, such as one-hundred twelve (112) bits of On-OFF keying (OOK) at a rate of one (1) Mb/s), and optionally, a burst pattern including an information packet utilizing OOK that may include, but is not limited to, ID information, a sequential burst count or other desired information for object or personnel identification, inventory control, etc. In some examples, the sequential burst count (e.g., a packet sequence number) from each tag 112a-f may be advantageously provided in order to permit, at the central processor/hub 111, correlation of TOA measurement data from different ones of the receivers 113a-l.

In some examples, the tag 112a-f employs UWB waveforms (e.g., low data rate waveforms) to achieve fine resolution because of their short pulse (i.e., sub-nanosecond to nanosecond, such as a 2 nsec (one (1) nsec up and one (1) nsec down)) durations. As such, the information packet may be of a short length (e.g. one-hundred twelve (112) bits of OOK at a rate of one (1) Mb/sec, in some examples), that advantageously enables a higher packet rate. If each information packet is unique, a higher packet rate results in a higher data rate. If each information packet is transmitted repeatedly, the higher packet rate results in a higher packet repetition rate. In some examples, higher packet rate repetition rate (e.g., twelve (12) hertz (Hz)) and/or higher data rates (e.g., one (1) Mb/sec, two (2) Mb/sec or the like) for each tag may result in larger datasets for filtering to achieve a more accurate location estimate. Alternatively or additionally, in some examples, the shorter length of the information packets, in conjunction with other packet rate, data rates and other system functionality, may result in a longer battery life (e.g., seven (7) years battery life at a transmission rate of one (1) Hz with a three-hundred (300) milliamp-hour (mAh) cell). An alternate implementation may be a generic compact, three (3) volt coin cell, series no. CR2032, with a battery charge rating of two-hundred twenty (220) mAhr, whereby the latter generic coin cell, as can be appreciated, may provide for a shorter battery life.

Tag signals may be received at a receiver 113a-l directly from RTLS tags 112a-f, or may be received after being reflected en route. Reflected signals travel a longer path from the RTLS tag to the receiver 113a-l than would a direct signal, and are thus received later than the corresponding direct signal. This delay is known as an echo delay or multipath delay. 112a-f If reflected signals are sufficiently strong enough to be detected by the receiver 113a-l, they can corrupt a data transmission through inter-symbol interference. Reflected signals can be expected to become weaker as delay increases due to more reflections and the longer distances traveled. Thus, beyond some value of inter-pulse time (e.g., nine-hundred ninety-eight (998) nsec), corresponding to some path length difference (e.g., 299.4 m), there will be no advantage to further increases in inter-pulse time (and, hence lowering of burst data rate) for any given level of transmit power. In this manner, minimization of packet duration allows the battery life of a tag to be maximized, since its digital circuitry need only be active for a brief time. Different environments can have different expected echo delays, so that different burst data rates and, hence, packet durations, may be appropriate in different situations depending on the environment.

Reduction or minimization of the packet duration allows a tag 112a-f to transmit more packets in a given time period, although in practice, regulatory average EIRP limits may often provide an overriding constraint. However, brief packet duration also reduces the likelihood of packets from multiple tags overlapping in time, causing a data collision. Thus, minimal packet duration allows multiple tags 112a-f to transmit a higher aggregate number of packets per second, allowing for the largest number of tags 112a-f to be tracked, or a given number of tags 112a-f to be tracked at the highest rate.

In some examples, sensor telemetry data may be transmitted from the tag 112a-f to provide the receivers 113a-l with information about the environment and/or operating conditions of the tag 112a-f. For example, the tag 112a-f may transmit a temperature to the receivers 113a-l. Such information may be valuable, for example, in a system involving perishable goods or other refrigerant requirements. In this example embodiment, the temperature may be transmitted by the tag 112a-f at a lower repetition rate than that of the rest of the data packet. For example, the temperature may be transmitted from the tag 112a-f to the receivers 113a-l at a rate of one time per minute (e.g., one (1) TX/min), or in some examples, once every seven-hundred twenty (720) times the data packet is transmitted, whereby the data packet in this example is transmitted at an example rate of twelve (12) TX/sec.

In some examples, the tag 112a-f is programmed to intermittently transmit data to the receivers 113a-l in response to a signal from a magnetic command transmitter (not shown). The magnetic command transmitter may be a portable device, functioning to transmit a one-hundred twenty-five (125) kilohertz (kHz) signal, in some examples, with a range of approximately fifteen (15) feet or less, to one or more of the tags 112a-f. In some examples, the tags 112a-f may be equipped with at least a receiver tuned to the magnetic command transmitter transmit frequency (e.g., one-hundred twenty-five (125) kHz) and functional antenna to facilitate reception and decoding of the signal transmitted by the magnetic command transmitter.

In some examples, one or more (preferably four or more) other tags, such as the reference tags 114a-b in FIG. 1, are positioned within and/or about the monitored region 118. In some examples, the reference tag 114a-b is configured to transmit a signal that is used to measure the relative phase (e.g., the count of free-running counters) of non-resettable counters within the receivers 113a-l.

In some examples, the receivers 113a-l are connected in a "daisy chain" 119 fashion to advantageously allow for a large number of receivers 113a-l to be interconnected over a significant monitored region 118 to reduce and simplify cabling, reduce latency, provide power, and/or the like. Each of the receivers 113a-l includes one or more filters and one or more detectors for receiving and processing transmissions, such as UWB transmissions, and preferably, a packet decoding circuit that extracts a time of arrival (TOA) timing pulse train, transmitter ID, packet number, and/or other information that may have been encoded in the tag transmission signal (e.g., material description, personnel information, etc.) and is configured to sense signals transmitted by the tags 112a-f and one or more reference tags 114a-b. Example filters and detectors disclosed herein for receiving and processing such transmissions are described in detail below.

In the illustrated example of FIG. 1, each receiver 113a-l includes a time measuring circuit that measures times of arrival (TOA) of tag bursts, with respect to its internal counter. The time measuring circuit is phase-locked (e.g., relative phase differences do not change and therefore respective frequencies are identical) with a common digital reference clock signal distributed via cable connection from the central processor/hub 111 having a central timing reference clock generator. The reference clock signal establishes a common timing reference for the receivers 113a-l. Thus, multiple time measuring circuits of the respective receivers 113a-l are synchronized in frequency, but not necessarily in phase. While there typically may be a phase offset between any given pair of receivers in the receivers 113a-l, the offset is readily determined through use of one or more of the reference tags 114a-b. Alternatively or additionally, each receiver 113a-l may be synchronized wirelessly via virtual synchronization without a dedicated physical timing channel.

In some example embodiments, the receivers 113a-l are configured to determine attributes of the received signal. In the illustrated example of FIG. 1, as measurements are determined at each receiver 113a-l in a digital format, rather than analog, signals are transmittable to the central processor/hub 111. Advantageously, because packet data and measurement results can be transferred at high speeds to a receiver memory, the receivers 113a-l can receive and process tag (and corresponding object) locating signals on a nearly continuous basis. As such, in some examples, the receiver memory allows for a high burst rate of tag events (i.e., information packets) to be captured.

Data cables or wireless transmissions may convey measurement data from the receivers 113a-l to the central processor/hub 111 (e.g., the data cables may enable a transfer speed of two (2) Mbps). In some examples, measurement data is transferred to the central processor/hub 111 at regular polling intervals.

In the illustrated example, the central processor/hub 111 determines or otherwise computes a tag location (i.e., object location) by processing TOA measurements relative to multiple data packets detected by the receivers 113a-l. In some examples, the central processor/hub 111 is configured to resolve the coordinates of a tag 112a-f using nonlinear optimization techniques.

In some examples, TOA measurements from multiple receivers 113a-l are processed by the central processor/hub 111 to determine a location of a tag 112a-f by a differential time-of-arrival (DTOA) analysis of the multiple TOAs. The DTOA analysis includes a determination of tag transmit time to, whereby a time-of-flight (TOF), measured as the time elapsed from the estimated tag transmit time to to the respective TOA, represents graphically the radii of spheres centered at respective receivers 113a-l. The distance between the surfaces of the respective spheres to the estimated location coordinates $(x_0, y_0, z_0)$ of the transmit tag 112a-f represents the measurement error for each respective TOA, and the minimization of the sum of the squares of the TOA measurement errors from each receiver participating in the DTOA location estimate provides for the location coordinates $(x_0, y_0, z_0)$ of the transmit tag 112a-f and of that tag's transmit time to.

In some examples, the system described herein may be referred to as an "over-specified" or "over-determined" system. As such, the central processor/hub 111 may then calculate one or more valid (i.e., most correct) locations based on a set of measurements and/or one or more incorrect (i.e., less correct) locations. For example, a location may be calculated that is impossible due the laws of physics or may be an outlier when compared to other locations. As such one or more algorithms or heuristics may be applied to minimize such error. The starting point for the minimization may be obtained by first doing an area search on a coarse grid of x, y and z over an area defined by the user and followed by a localized steepest descent search. The starting location for this algorithm is fixed, in some examples, at the mean position of all active receivers. In some examples, no initial area search is needed, and optimization proceeds through the use of a Davidon-Fletcher-Powell (DFP) quasi-Newton algorithm. In other examples, a steepest descent algorithm may be used. In each case, the algorithms may be seeded with an initial location estimate (x, y, z) that represents the two-dimensional (2D) or three-dimensional (3D) mean of the positions of the receivers 113a-l that participate in the tag location determination.

One example algorithm for error minimization, which may be referred to as a time error minimization algorithm, is described in Equation 1:

$$\varepsilon = \sum_{j=1}^{N} \left[ [(x-x_j)^2 + (y-y_j)^2 + (z-z_j)^2]^{\frac{1}{2}} - c(t_j - t_0) \right]^2 \quad (1)$$

Where N is the number of receivers, c is the speed of light, $(X_j, Y_j, Z_j)$ are the coordinates of the $j^{th}$ receiver, $t_j$ is the arrival time at the $j^{th}$ receiver, and to is the tag transmit time. The variable to represents the time of transmission. Since to is not initially known, the arrival times, $t_j$, as well as $t_0$, are related to a common time base, which in some examples, is derived from the arrival times. As a result, differences between the various arrival times have significance for determining location as well as $t_0$.

In some examples, the locating system 100 comprises a receiver grid, whereby each of the receivers 113a-l in the receiver grid keeps a receiver clock that is synchronized, with an initially unknown phase offset, to the other receiver clocks. The phase offset between any receivers may be deteiniined by use of the reference tag 114a-b that is positioned at a known coordinate position $(x_T, y_T, z_T)$. The phase offset serves to resolve the constant offset between counters within the receivers 113a-l, as described below.

In some examples, a number N of receivers 113a-l $\{R_j: j-1, \ldots, N\}$ positioned at known coordinates $(x_{Rj}, y_{Rj}, z_{Rj})$, which are respectively located at distances $d_{Rj}$ from a reference tag 114a-b, such as given in Equation 2:

$$d_{Rj} = \sqrt{(x_{Rj}-x_T)^2 + (y_{Rj}-y_T)^2 + (z_{Rj}-Z_T)^2} \quad (2)$$

Each receiver $R_{Rj}$ utilizes, for example, a synchronous clock signal derived from a common frequency time base, such as clock generator. Because the receivers are not synchronously reset, an unknown, but constant offset $O_j$ exists for each receiver's internal free running counter. The value of the constant offset $O_j$ is measured in terms of the number of fine resolution count increments (e.g., a number of nanoseconds for a one nanosecond resolution system).

The reference tag 114a-b is used, in some examples, to calibrate the radio frequency locating system as follows: The reference tag 114a-b emits a signal burst at an unknown time $\tau_R$. Upon receiving the signal burst from the reference tag 114a-b, a count $N_{Rj}$ as measured at receiver $R_j$ is given in Equation 3 by:

$$N_{Rj} = \beta\tau_R + O_j + \beta d_{Rj}/c \quad (3)$$

Where c is the speed of light and β is the number of fine resolution count increments per unit time (e.g., one per nanosecond). Similarly, each object tag $T_i$ of each object to be located transmits a signal at an unknown time $\tau_i$ to produce a count $N_{i_j}$ as given in Equation 4:

$$N_{i_j} = \beta \tau_i + O_j + \beta d_{i_j}/c \qquad (4)$$

At receiver $R_j$ where $d_{i_j}$ is the distance between the object tag $T_i$ and the receiver 113a-l $R_j$. Note that $\tau_i$ is unknown, but has the same constant value for all receivers. Based on the equalities expressed above for receivers $R_j$ and $R_k$ and given the reference tag 114a-b information, phase offsets expressed as differential count values are determined as given in Equations 5a-b:

$$N_{R_j} - N_{R_k} = (O_j - O_k) + \beta\left(\frac{d_{R_l}}{c} - \frac{d_{R_k}}{c}\right) \text{ or,} \qquad (5a)$$

$$(O_j - O_k) = (N_{R_j} - N_{R_k}) - \beta\left(\frac{d_{R_l}}{c} - \frac{d_{R_k}}{c}\right) = \Delta_{j_k} \qquad (5b)$$

Where $\Delta_{j_k}$ is constant as long as $d_{R_j} - d_{R_k}$ remains constant, (which means the receivers 113a-l and reference tag 114a-b are fixed and there is no multipath situation) and β is the same for each receiver 113a-l. Note that $\Delta_{j_k}$ is a known quantity, since $N_{R_j}$, $N_{R_k}$, β, $d_{R_j}/c$, and $d_{R_k}/c$ are known. That is, the phase offsets between receivers $R_j$ and $R_k$ may be readily determined based on the reference tag transmissions. Thus, again from the above equations, for a tag 112a-f ($T_i$) transmission arriving at receivers $R_j$ and $R_k$, one may deduce the following Equations 6a-b:

$$N_{i_j} - N_{i_k} = (O_j - O_k) + \beta\left(\frac{d_{i_j}}{c} - \frac{d_{i_k}}{c}\right) = \Delta_{j_k} + \beta\left(\frac{d_{i_j}}{c} - \frac{d_{i_k}}{c}\right) \text{ or} \qquad (6a)$$

$$d_{i_j} - d_{i_k} = (c/\beta)\lfloor N_{i_j} - N_{i_k} - \Delta_{j_k} \rfloor \qquad (6b)$$

Each arrival time, $t_j$, can be referenced to a particular receiver (receiver "1") as given in Equation 7:

$$t_j = \frac{1}{\beta}(N_j - \Delta_{j1}) \qquad (7)$$

Figure 7:
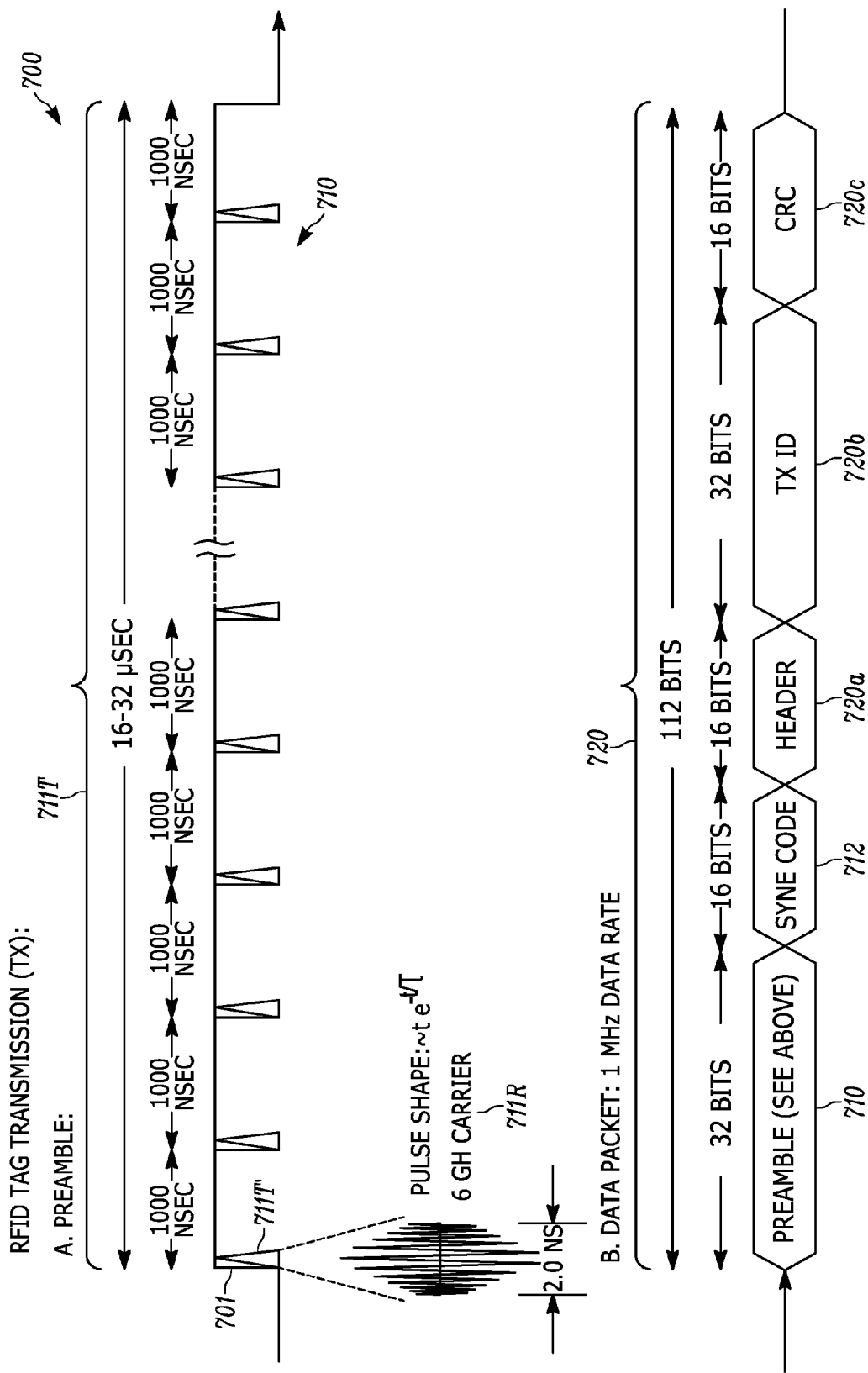
FIG. 7 illustrates a timing diagram for an RTLS tag transmission (TX) in an example high-resolution time-of-arrival (TOA) determination system.

The minimization, described in Equation 1, may then be performed over variables (x, y, z, $t_0$) to reach a solution (x', y', z', $t_0$'). FIG. 7 shows an example timing diagram 700 for an RTLS tag transmission (TX) in a high-resolution TOA determination system. The example timing diagram 700 includes a TX clock 701, a preamble 710, and a data packet 720, which as presented in FIG. 7, includes the preamble 710 as a subset of the data packet 720. The preamble 710 is composed of a transmit (TX) series of pulses 711T, wherein the TX series of pulses 711T are equally spaced in time, in accordance with a period associated with the TX clock 701. In some examples, the period associated with the TX clock is approximately one (1) microsecond (μsec), whereby the TX clock 701 operates at a frequency of one (1) MHz.

Each individual TX pulse 711T in the TX series of pulses 711T is identical. In some examples, the TX pulse 711T' includes a six (6) GHz carrier wave modulated by a two (2) nsec pulse, such as a triangular or rectangular function (rect). In some examples, the TX pulse 711T' is additionally shaped at a receiver 113a-l by a transmit and receive antenna and any electronics associated with an amplification or pre-amplification of the TX pulse 711T', in conjunction with the high-resolution TOA determination system. In some examples, the TX pulse 711T' shape at the receiver 113a-l, denoted RX pulse 711R', may be consistent with a function $\sim t\, e^{-t/\tau}$. The TX series of pulses 711T is used to provide for an iterative windowing function, such as, for example, an adjustable coarse timing window 800, which is described below in connection with FIG. 8.

The data packet 720 includes at least the following data words: the aforementioned preamble 710, a sync code 712, a header 720A, a transmit identification (TX ID) 120B, and a CRC word 120C. The sync code 712 represents a known sequence of 1's and 0's. In some examples, the 1's and 0's may be distributed in other ways. In some examples, the sync code 712 is sixteen (16) bits long. In the illustrated example, the sync code 712 consists primarily of 1's, which represent the TX pulses 711T'—rather than 0's, which represent 'blanks,' or no pulse. The sync code 712 is used to provide for a registration code 950 in response to each of the TX pulses 711T' associated with the sync code 712, whereby the registration code 850 provides for a record of a detection of the sync code 712 in a receiver (RX) fine timing window function 900, which is described below in connection with FIG. 9.

The data packet 720 is transmitted by the RTLS tag transmitter, in some examples, continually and periodically. In some examples, the transmission of the data packet 720 is initiated immediately at the end of the one (1) μsec period associated with a final transmit bit, which in this example is the least significant bit of CRC 720c. In some examples, a waiting period between successive transmissions is established.

In some examples, the over-the-air data packet 720 is one-hundred twelve (112) bits long, wherein the bit distribution may be as follows: the preamble 710 (e.g., thirty-two (32) bits), the sync code 712 (e.g., sixteen (16) bits), the header 720A (e.g., sixteen (16) bits), the TX ID 720b (e.g., thirty-two (32) bits), and the CRC 720C (e.g., sixteen (16) bits). In some examples, a transmission time associated with the data packet 720 and the aforementioned one (1) MHz data rate is one-hundred twelve (112) μsec. In this example, when coupled with a thirty-two (32) μsec preamble 710, a data RTLS tag transmission time may be calculated to be one-hundred forty-four (144) μsec per transmission, or one-hundred forty-four (144) μsec/TX. With a data rate equal to 144 μsec/TX, as described in this example, it may be possible to accommodate up to ten-thousand (10,000) transmissions (e.g., single transmissions associated with up to ten-thousand 10,000 RTLS tags in the high-resolution TOA determination system) in just over one (1) second.

In other examples, the data packet 720 may consist of a plurality of data long words 720B', immediately following the TX ID 720B and preceding the CRC 720C, resulting in a longer data packet 720. In some examples, the plurality of data long words 720B' are each thirty-two (32) bits long.

In some examples, the plurality of data long words 720B' may include one or more of a temperature, an acceleration, and an attitude of rotational displacement. In some examples, the plurality of data long words 720B' may include a 'Query' command to the receiver, wherein the RTLS tag transmitter, in this example, is equipped with a one-hundred twenty-five (125) KHz receiver and associated firmware to decode a response.

Figure 8:
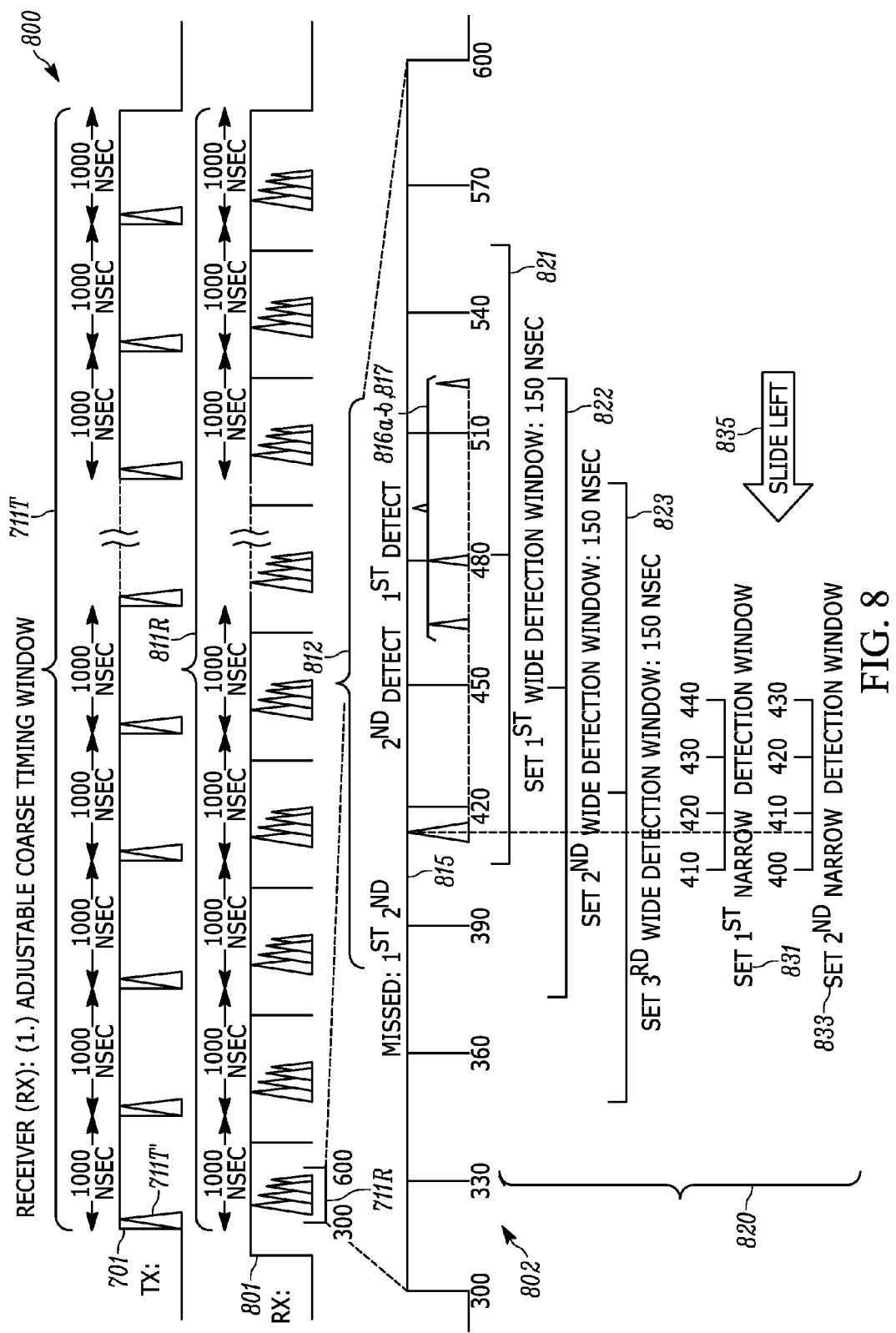
FIG. 8 illustrates a timing diagram for an adjustable timing window function.

FIG. 8 shows an example timing diagram for a receiver (RX) adjustable coarse timing window function 800. The example timing diagram of FIG. 8 includes the TX clock 701 and the TX series of pulses 711T associated with the RTLS tag transmission (TX) 700, presented in FIG. 7, and an RX clock 801 and an RX clock timing diagram 802. A received (RX) pulse train 811R is composed of a series of the RX pulses 711R, corresponds to the TX series of pulses 711T, and is synchronized to the RX clock 801, which is resident at an example receiver 113a-l in the receiver grid. An RX pulse signature 812, representing an earliest pulse 815 and a series of echoes 816a-b and possible noise pulses 817, as shown in FIG. 8, is associated with the RX clock timing diagram 802, and is also associated with the corresponding TX pulse 711T'.

In the example presented in FIG. 8, the one (1) MHz TX clock 701, as presented in FIG. 7, and the associated one (1) MHz RX clock 801 may be out of phase with respect to each other. The relative stability of the respective TX clock 701 and RX clock 801 frequencies for the short duration TX transmit time allows for an iterative, adaptive adjustment of the RX clock 801 phase with respect to the TX clock 701 phase, effecting a change in the receiver RX adjustable coarse timing window function 800.

The example RX adjustable coarse timing window function 800 of FIG. 8, is composed of a series of detection windows 820, including wide detection windows 821-823 and narrow detection windows 831 and 833, and an associated set of functions to adaptively position the series of wide and narrow detection windows 820 to center the RX pulse 711R in the corresponding window. In the example of FIG. 8, there are three (3) wide detection windows 821-823 and two (2) narrow detection windows 831 and 833, however this should not be considered limiting. For notation convenience, the last window in the series of wide and narrow detection windows 820 is called a final detector window.

In the example of FIG. 8, a first detection window 821 may be centered at four-hundred eighty (480) nsec, for example, with a width of one-hundred (150) nsec. The center of the first detector window is a function of a first registered detection, wherein the present example registers a first registered detection at a second echo 816b of the RX pulse 711R. In some examples, the width of the first detection window 821 is a function of an expected distance from the RTLS tag transmitter to the receiver 113a-l, the distance-to-time relationship given by the RF propagation time—the speed of light in a vacuum (c)—approximately one (1) foot per nsec.

The first wide detection window 821 may be adaptively updated by a second wide detection window 822 as provided by evidence of a second registered detection, wherein the present example registers a second registered detection at a first echo 816a of the RX pulse 711R. In the example of FIG. 8, the second wide detection window 822 is centered at approximately four-hundred sixty (460) nsec with a width of one-hundred fifty (150) nsec. Similarly, the second wide detection window 822 may be adaptively updated by a third detection window 823 as provided by evidence of a third registered detection, wherein the present example registers a third registered detection at an earliest pulse 815 of the RX pulse 711R. In the example embodiment, the third detection window 823 may be centered at approximately four-hundred fifteen (415) nsec with a width of one-hundred fifty (150) nsec.

The series of wide detection windows 821-823 continue to be adaptively updated by the registered detections of RX pulses 711R that include the RX pulse train 811R corresponding to the TX series of pulses 711T in the preamble 710. In some examples, a final wide detector window 823 is declared after a detection of ten (10) RX pulses 711R. At which point a final wide detector window 823 is determined, the registered detections for the series of wide detection windows 821-823 ends, and the series of narrow detection windows 831-833 is implemented.

In the example of FIG. 8, a first narrow detection window 831 is centered at the center of wide detection window 823. The width of the first narrow detection window 831 is thirty (30) nsec, in some examples. Note that, as the example of FIG. 8 demonstrates, a timing shift may result with the registered detection of the RX pulse 711R associated with the final wide detection window 833. The placement of the first narrow detection window 831, centered at four-hundred twenty-five (425) nsec-, graphically represents such a shift, as the earliest pulse 815 associated with the RX pulse 711R appears to be registered along the RX clock timing diagram 802 closer to four-hundred fifteen (415) nsec.

Figure 9:
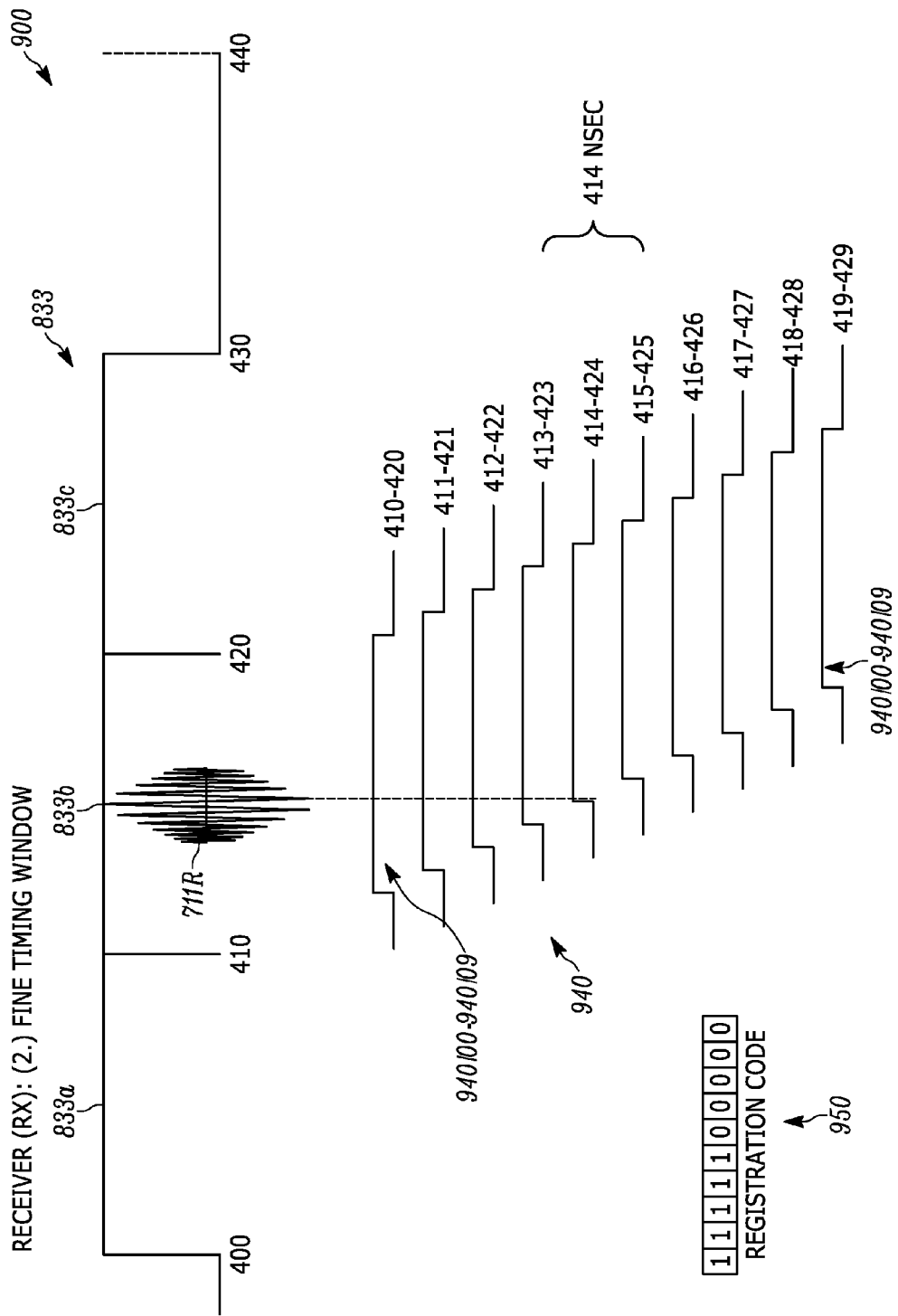
FIG. 9 illustrates a timing diagram for a receiver (RX) fine timing window function.

Each of the series of narrow detection windows 831 and 833 is composed of three (3), ten (10) nsec, disjoint timing windows 831a-c and 833a-c (see FIG. 9). Detections for the RX pulses 711R that include the RX pulse train 811R are registered in parallel in each of the three disjoint timing windows 831a-c, for example, to determine to which of the three disjoint timing windows 831a-c the detection should be assigned. The purpose of the series of narrow detection windows 831 and 833 is to ensure that the final detection associated with the final RX pulse 711R in the RX pulse train 811R is registered in a final center disjoint timing window 833b associated with the final detector window 833. A slide narrow window function 835 to slide the series of narrow detection windows left and right in ten (10) nsec increments, for example, is provided as a method to achieve the aforementioned requirement, and as such the final detection associated with the final RX pulse 711R in the RX pulse train 811R is registered in the center of the final detector window 833.

The example RX adjustable coarse timing window function 800 of FIG. 8, may be implemented as a first feedback loop, wherein a pulse detector resides in the forward feed and the slide window function 835 may include the feedback. The pulse detector may determine whether or not pulse detection is registered in the currently prescribed disjoint timing windows 831a-c, for example, for any of the series of narrow detection windows 831 and 833. As a function of the detections registered in the currently prescribed disjoint timing windows 831a-c, for example, a feedback function may determine which direction a shift is to be made, and in some examples, what is the magnitude of the prescribed shift, if different from a default shift value of ten (10) nsec, for example.

As previously stated, the default shift magnitude is equal to the shift magnitude presented in the example given in FIG. 8, that of ten (10) nsec, for example. A minimum shift magnitude may also be given (e.g., ten (10) nsec). Larger shift magnitudes may be incorporated, dependent on the detection algorithm. In some examples, a detection algorithm that may determine multiple echoes 816a-b as registered in a relatively wide detector window may include logic to 'skip' left over several reflections at once to expedite the capture of the earliest pulse 815, the line-of-sight channel. In such instances, a registration of multiple echoes 816a-b in the relatively wide detector window may be determined by the relative amplitude of the registered detections.

Multiple echoes 816a-b or reflections may be registered in the same detector window in, for example, reflective environments, such as environments surrounded by conductors. By contrast, it is unlikely that both the earliest pulse 815, the line-of-sight channel, and an echo 816a-b or reflection might arrive within the limits of the same wide detector window 821-823, as the time difference between the earliest pulse 815, the line-of-sight channel, and the echo 816a-b, the reflection, may be on the order of tens of feet, or greater than one-hundred (150) nsec difference in TOA, the width of the wide detector windows in this example.

Further, the detectors themselves may include several functions that may affect an improved detection resolution. For example, the detectors may be assigned a detection level or a threshold level that may determine whether the magnitude of the earliest pulse 815, one or more of the echoes 816a-b, or a noise pulse 817 is in fact a signal, or just a low-level background noise interference. Alternatively or additionally, for example, a signal-to-noise (SNR) level may be monitored dynamically, and the detection threshold level adjusted accordingly. In a further advancement, a relative strength of the signal may be monitored dynamically, whereby the strength of the signal, in conjunction with a TOA determination associated with the signal, may include two inputs to an automatic gain control (AGC) for either a pre-amplification or an amplification of the signal.

FIG. 9 shows an example timing diagram for a receiver (RX) fine timing window function 900. FIG. 9 includes the final detector window 833 and the three (3), ten (10) nsec disjoint timing windows 833a-c associated with the final detector window 833, and a parallel set of fine detector windows 940. The final detector window 833 and the fine detector windows 940 are synchronized with the RX clock timing diagram 802, as shown in FIG. 8. The leading edge of a first fine detector window 940/00 is synchronous with the leading edge of the final center disjoint timing window 833b associated with the final detector window 833. The RX fine timing window function 900 includes registering a series of detections in the parallel set of fine detector windows 940, each associated with the final center disjoint timing window 833b. The series of detections in the parallel set of fine detector windows 940 provides for a detection record of the sync code 712, the sequence of 1's and 0's TX pulses 711T transmitted by the RTLS tag transmitter.

The registering the series of detections in the parallel set of fine detector windows 940, each associated with the final center disjoint timing window 833b, includes a generation of the registration code 850 which codifies the detections of the RX pluses 711R associated with the sync code 712 TX pulses 711T. The registration code 950 codifies the detections with respect to each of the fine detector windows 940/00-940/09 that include the set of fine detector windows 940, as shown in the example given in FIG. 9. As demonstrated for the example illustrated in FIG. 9, each successive fine detector window 940/00-940/09 overlaps the previous fine detector window 940/00-940/09 by one (1) nsec, and each of the fine detector windows 940/00-940/09 in the parallel set of fine detector windows 940 is ten (10) nsec wide.

As represented by the registration code 950 for the example of FIG. 9, a detection of the RX pulse 711R associated with the corresponding sync code 712 TX pulse 711T is registered in the fine detector windows 940/00-940/04, but no detection is registered in the fine detection windows 940/05-940/09. As such, it is inferred, in such instances, that the TOA for the RX pulse 711R is four-hundred fourteen (414) nsec after the leading edge of the RX clock 801.

Figure 10:
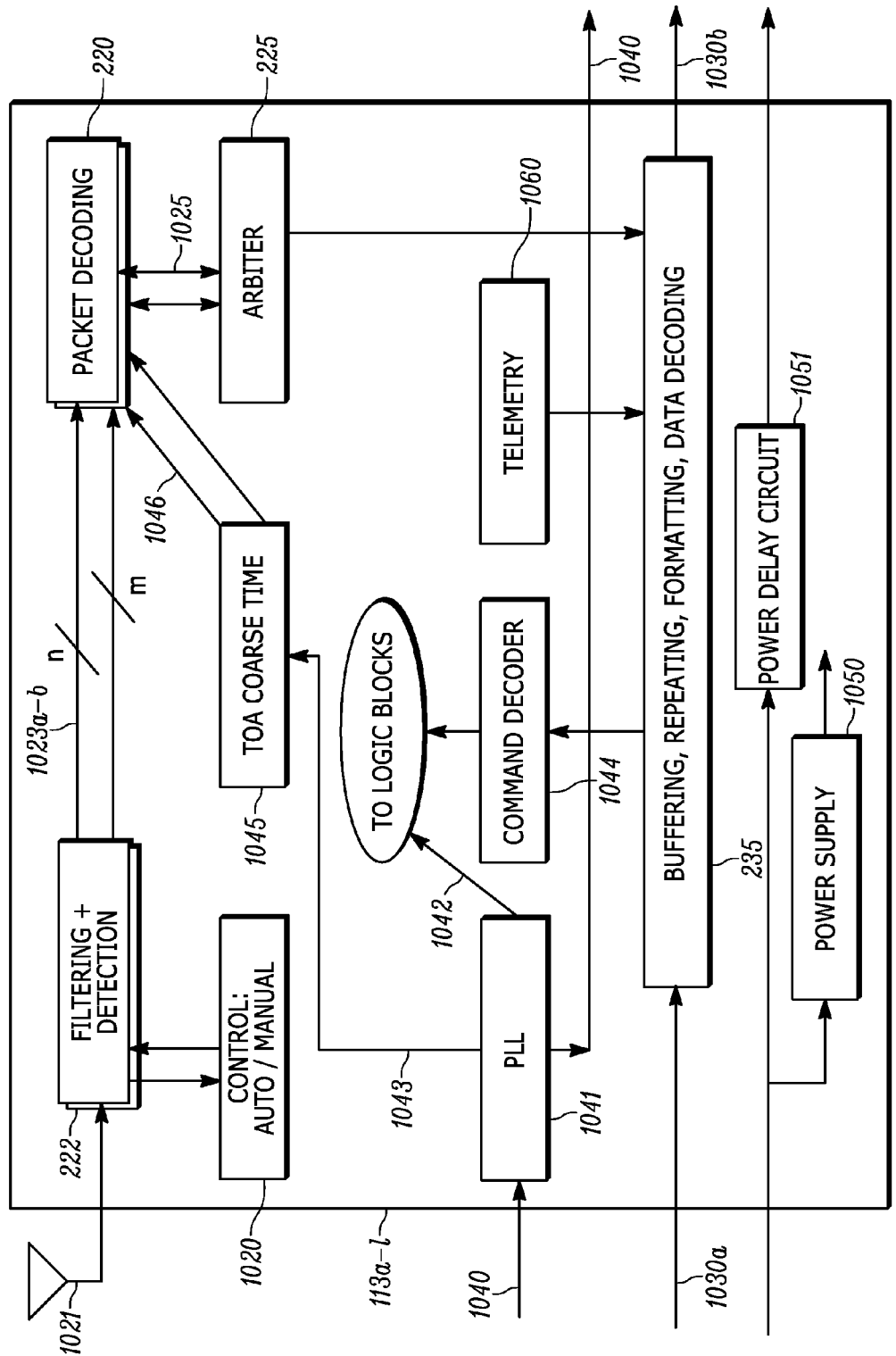
FIG. 10 is a block diagram representative of an example receiver implementing the example MSP of FIG. 2.

FIG. 10 is a block diagram representative of an example receiver 113 in a UWB receiver system (e.g., the locating system 100 of FIG. 1) that implements the example MSP 200 of FIG. 2. In some embodiments, over-the-air data packets 720 as shown in FIG. 7 are transmitted to the receiver 113 and received by at least one UWB antenna 1021. In the example of FIG. 10, the MSP 200 implemented by the receiver 113 includes at least two filtering and detection modules 222, at least two packet decoders 220, and an arbiter 225, which are configured as described above in connection with FIG. 2. In some embodiments, each of the filtering and detection modules 222 receives an analog signal from the same antenna 1021 (as shown in FIG. 10). Additionally, in some examples, bandwidths filtered by the different individual filtering and detection modules 222 vary to block specific interference, as described below in more detail with respect to FIG. 15. In alternative embodiments, such as when no interference is anticipated (e.g., by an entity tasked with configuring the locating system 100) at least two of the filtering and detection modules 222 receive analog signals from two different UWB antennas, thereby extending a field-of-view for the receiver 113, as described above with respect to FIG. 4.

Figure 14:
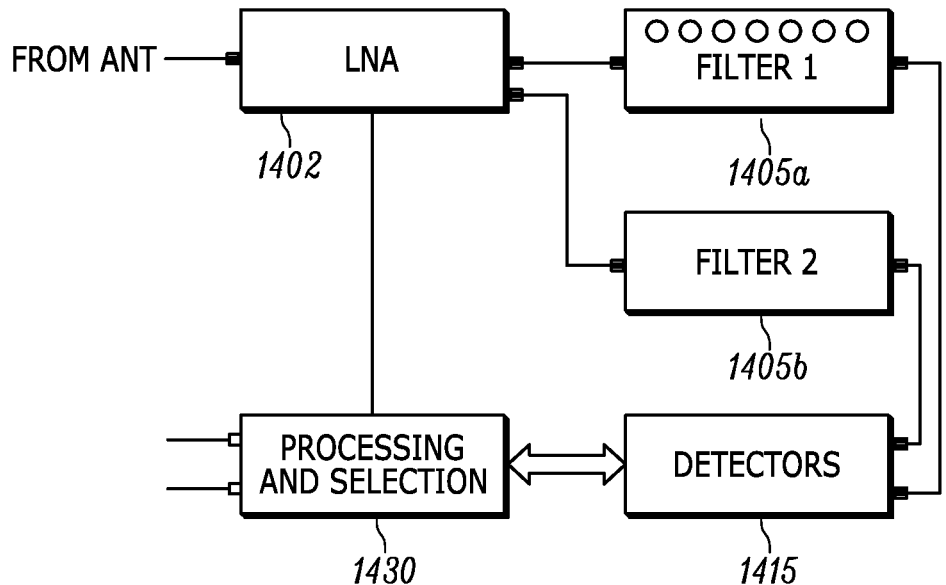
FIG. 14 is a first example receiver configuration constructed in accordance with teachings of this disclosure.

In some embodiments, each of the filtering and detection modules 222 that receives a respective analog signal from an antenna generates one or more digitized streams of pulses (e.g., using the comparators 215a, 215b for example), for decoding by the packet decoders 220. As shown in FIG. 10, there are two digitized stream sets, 1023a and 1023b, however it should be noted that there might be more than two filtering and detection modules 222 and, thus, more than two digitized streams of pulses 1023. As shown in FIG. 10, the digitized streams 1023a and 1023b are n wires wide and m wires wide, respectively. In some embodiments, a first one of the filtering and detection modules 222 includes n parallel, concurrent, independent detectors 215 functioning with n distinct threshold levels, configured to provide n digital data streams 1023a to a respective set of n packet decoders 220 (see description of FIG. 14 for more detail). Further, a second one of the filtering and detection modules 222 has m parallel, concurrent, independent detectors 215 functioning with m distinct threshold levels, configured to provide m digital data streams 1023b to a respective set of m packet decoders 220. In some embodiments, n and/or m is greater than or equal one. In some embodiments, n equals m. In alternative embodiments, n may not necessarily equal m. The various thresholds may be used to provide different sensitivities to noise and SNR, as described above. As shown in FIG. 10, there are n+m packet decoders 220, each operating on a respective digitized stream of pulses from a respective detector. That is to say each digitized stream is independently processed in parallel (as shown in FIG. 14). In some embodiments, the threshold levels applied to analog signal stream in the filtering and detection modules 222 are determined according to a function of a signal-to-noise ratio (SNR) present in the communication channel. In some embodiments, the individual threshold levels are set dynamically as a function of one or more of an antenna preamp gain and an estimated RTLS tag range. In some embodiments, the thresholds may be set at final test (e.g., calibration) for the various detectors according to noise level, and stored for later use. In some embodiments, the threshold values depend on RF gain and temperature. In some embodiments, a temperature compensation is performed by adjusting a baseband attenuator. In some embodiments, RTLS tag range may be restricted by adjusting RF gain on the receiver.

The packet decoders 220 perform two or more parallel, concurrent, identical signal-processing functions on the two or more sets of digital data streams 1023a-b. The two or more packet decoders 220 may be configured to receive valid over-the-air data packets 720 (FIG. 7) that correspond to RTLS tags 112a-f (FIG. 1) in the form of digitized stream provided by the detectors 215 in the filtering and detection module 222. In some examples, the packet decoders 220 may provide for a packet framing and extraction function as part of a data recovery circuit, whereby an RTLS tag 112a-f identification may be extracted. The RTLS identification may be extracted by the TX identification field 720b of the data packet 720, as described previously.

The packet decoding circuits 220 may process two or more parallel, concurrent, identical valid over-the-air data packets 720 from RLTS tags 112a-f. The data packet framing and extraction function, and the UWB TOA calculation function may each provide for a registration of each signal received at the filtering and detection blocks 222 with an indexed TOA and corresponding RTLS tag identification, the corresponding packet decoding circuits 220 and the corresponding time-stamped tag data packet 720. The time-stamped tag data packets are sent by TOA line 1025 to an arbiter 225. A packet decoding circuit 220 is described in more detail below with respect to FIG. 7.

In the example of FIG. 10, the arbiter 225 selects a time-stamped tag data packets received via the TOA lines 1025 provided by the packet decoders 220. The example arbiter 225 of FIG. 10 selects the TOA line 1025 that converges to the earliest TOA from the up to two or more packet decoders 220 driven by the sets of digital data streams 1023a-b.

The example arbiter 225 of FIG. 10 performs a tag queue function, whereby each of the time-stamped tag data packets is identified by an identifier associated with an RTLS tag 112a-f and an associated TOA. The tag queue function performs a formatting and ordering of the collection of RTLS tag identifiers and TOAs, effectively a first-in first-out (FIFO) memory buffer awaiting a transmission to the central processor/hub 111. Upon the tag queue function trigger, a time-stamped tag data packet 1027 is sent to a formatting and data coding/decoding function 235 that, in turn, repackages the time-stamped tag data packet 1027 and transmits a network data packet 1030b to the central processor/hub 111 (FIG. 1).

In some embodiments the network data packet may be transmitted over a conventional Ethernet LAN connection to the central processor/hub 111. In some embodiments, the network data packet 1030b transmitted by the formatting and data coding/decoding function 235 to the central processor/hub 111 may be synchronized by a ten (10) MHz receiver clock 1040, received from the previous receiver clock in the "daisy chain" 119, and transmitted to the next receiver clock in the "daisy chain" 119 following a synchronous frequency up/down convert. The receiver clock 1040 drives a phase-locked loop (PLL) 1041, whereby a frequency divider in a feedback loop in conjunction with a voltage-controlled oscillator (VCO) provides a one-hundred (100) MHz receiver clock 1042 that is synchronized in phase to the ten (10) MHz receiver clock 1040. The one-hundred (100) MHz receiver clock 1042 is provided to synchronize all logic blocks in the receiver 113. The one-hundred (100) MHz receiver clock 1042 provides for the parallel set of fine detector windows 940, a basis of a set of receiver timing windows used to capture and register pulses transmitted by RTLS tags 112a-f in the TOA determination, as described previously with respect to FIG. 9.

A second function of the formatting and data coding/decoding function 235 is a buffering, reformatting, and repeating of central processor data received 1030a and transmitted 1030b between the receiver 113 and the central processor/hub 111 via the "daisy chain" 119 receiver network. The central processor data 1030a-b received and transmitted from and to the formatting and data coding/decoding function 235 may include a series of commands that are decoded at a command decoder 1044 to trigger receiver functions. Examples of such functions include an auto/manual control function 1020, a series of telemetry functions 1060, and pruning (e.g., by the arbiter 225) a data queue and to manage, delete, and reorder the data queue. The auto/manual control function 1020 may be commanded (e.g., from manual mode) to report sensor information such as, for example, temperature and/or other telemetry data recorded in the telemetry function 1060, and may be commanded to manually adjust one or more of an antenna preamp gain and the previously described threshold levels of the filtering and detection modules 222.

A power supply 1050 may be configured to power the receiver 113 by way of an AC-DC convertor, whereby the AC power may be provided as an input from the central processor/hub 111. The power supply 1050 may be accompanied, in some embodiments, by a power delay circuit 1051 to allow for an orderly 'power up' of sequential receivers 113a-l, thus avoiding a power surge and over-current event in the central processor data 1030a-b transmission lines.

In some example embodiments, the UWB receiver system transmits packet data and measurement results at high speeds to TOA measurement buffers within the arbiter 225, such that the receivers 113a-l can receive and process tags 112a-f (and corresponding object) locating signals on a nearly continuous basis. That is, multiple valid time-stamped data packets 720 can be processed in close succession, thereby allowing the use of hundreds to thousands of tag transmitters.

In some embodiments, data stored in TOA measurement buffers implanted by, for example, the arbiter 225, is sent to a central processor/hub 111, over the central processor data transmission lines 1030a-b in response to a specific request from the central processor/hub 111.

In some embodiments, the collection of the central processor data 1030a-b transmission lines connecting the "daisy chain" 119 network of receivers 113a-l is composed of two bi-directional data links. In some embodiments, these data links may be RS422 differential serial links. A network interface may receive command signals from a central processor/hub 111 on one link, for example, to instruct a transfer of the TOA measurement buffer to the central processor/hub 111. Additional commands may include those to adjust one or more operating characteristics or parameters of the filtering and detection modules 222 such as gain and/or detection thresholds used by the detectors 215. The bi-directional data links may also provide for buffer for data signals linked between "daisy chain" 119 receivers 113a-l, buffering sequential transmissions between the present and next receivers 113a-l in a communications chain.

The synchronous frequency up/down convert performed on the ten (10) MHz receiver clock 1040 provides a driver for the receiver clock 1040 transmitted to the next reader in the "daisy chain" 119. An advantage of this approach, in some examples, is that the ten (10)MHz receiver clock 1040 transmitted to the next receiver, as with the original ten (10)MHz receiver clock 1040, may be made low enough in frequency so that it can be transmitted over low-cost cables (e.g., twisted pair wires). As timing jitter of the local timing reference signal degrades as an PLL multiplier coefficient is increased, there is a necessary trade-off between frequency and jitter of the local timing reference signal and the frequency of the timing reference clock.

Utilizing a common ten (10)MHz receiver clock 1040 for timing reference, a plurality of local timing reference signals (one in each receiver) can be precisely matched in frequency. Using this approach, additional receivers can be connected without concern for clock loading. Buffer delay is also not an issue since the timing reference clock is used for frequency only, and not phase reference.

In some embodiments, the ten (10)MHz receiver clock 1040 may include differential signals. The use of differential clock signals is advantageous since they avoid clock duty cycle distortion, which can occur with the transmission of relatively high-speed clocks (e.g., >ten (10)MHz) on long cables (e.g., >one-hundred (100) feet).

Figure 11:
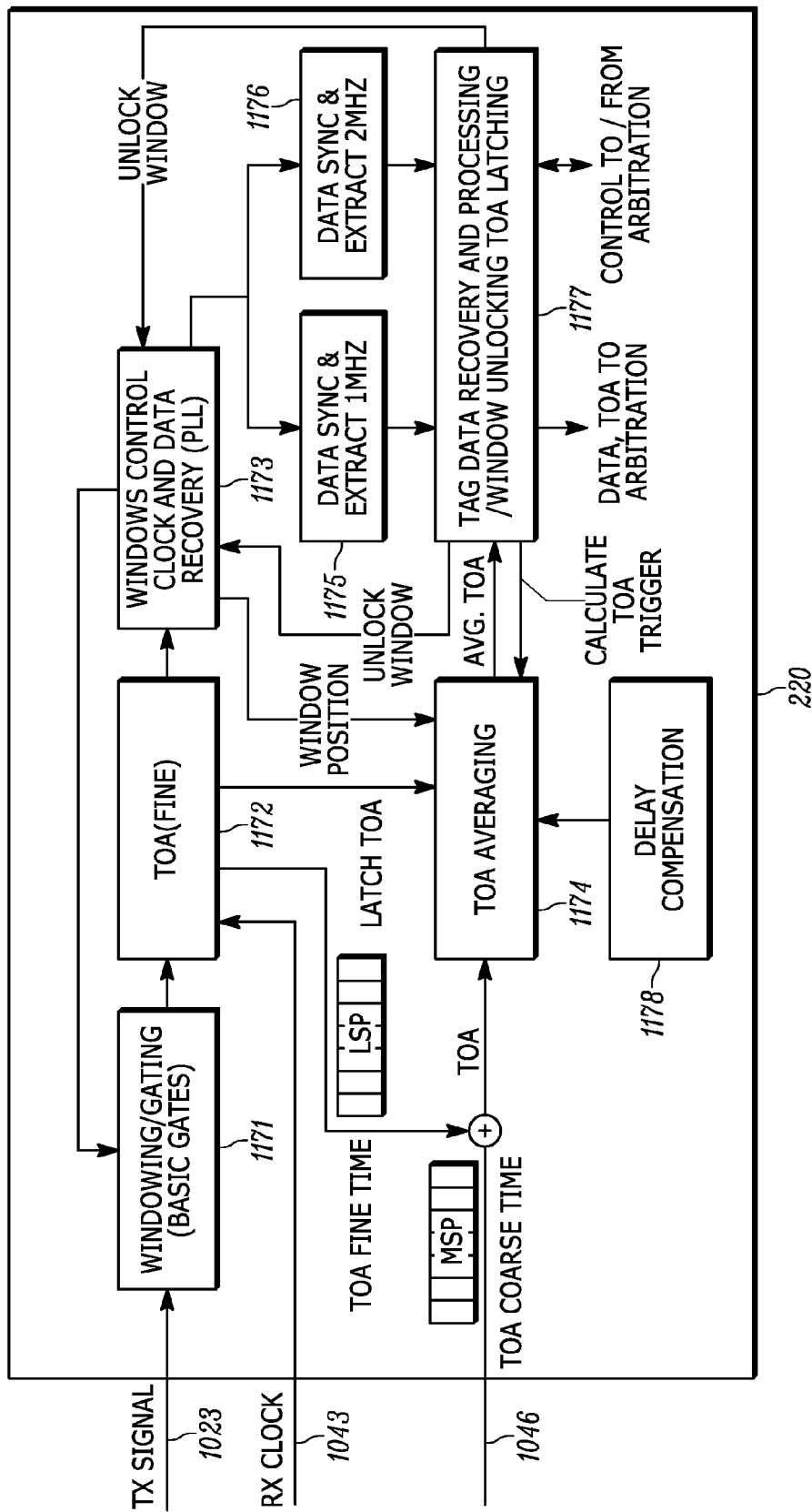
FIG. 11 is a block diagram representative of an example packet decoder.

FIG. 11 is a block diagram representative of an example implementation of the packet decoder 220 disclosed above. In some examples, the packet decoder 220 includes a windowing/gating function 1171, a TOA function 1172, a window control clock and data recovery (PLL) function 1173, a TOA averaging function 1174, a data sync and extract function (1 MHz-7 MHz) 1175-1176, a tag data recovery and processing function 1177, and a delay compensation circuit 1178. The packet decoder 225 processes the digital data stream 1023 received from one of the filtering and detection modules 222, as shown in FIG. 10, to provide an unpacked data packet and the TOA associated with the RTLS tag to the arbiter 225.

The windowing/gating function 1171 and the window control clock and data recovery clock PLL 1173 work as a feedback loop to recover the TX clock 701 and provide for the adjustable coarse timing window function 800, as presented in FIG. 8 and described previously. The TOA function 1172 works in conjunction with the one-hundred (100) MHz receiver clock 1042. The RX clock 801 provides for a TOA coarse time associated with the adjustable coarse timing window function 800, shown in FIG. 8, by registering detections for the RX pulses 711R that include the RX pulse train 811R corresponding to the TX pulses 711T in the series of TX pulses 711 in the preamble 710. The parallel set of fine detector windows 940 provides a TOA fine time associated with the fine timing window function 900, shown in FIG. 9, by recording detections by a registration code 950 for the RX pulses 711R that include the sync code 712 TX pulses 711T. The description for the adjustable coarse windowing function 800 and the fine timing window function 900 are given previously with the presentation of FIGS. 8-9, respectively.

The TOA fine time the registration code 950, and the final coarse detector window 830, as determined by the adjustable coarse timing window function 800, are sent to the TOA averaging function 1174, along with a latch TOA control signal indicating the end of a TOA determination. Further, in packet decoders 220 operating on narrowly filtered signals, a delay compensation module may provide TOA averaging function 1174 with a group delay value to calculate TOA. As previously described, the group delay value that results from the narrow filtering may be obtained by comparing timestamps of the same signal processed by a narrow filter and a wide filter. This group delay value may then be stored in a memory in delay compensation module 1178, and used when calculating the TOA. Thus, the TOA of a narrowly filtered signal will be similar to that of a widely filtered signal, and the central processor/hub 111 will continue to calculate accurate locations, regardless of whether the signal was narrowly or widely filtered. The TOA averaging function 1174 is activated by a calculate TOA trigger, and the averaged TOA is then sent to the tag data recovery and processing function 1177.

The data sync and extract function (1 MHz-2 MHz) 1175-1176 is triggered upon phase lock of the PLL associated with the window control clock and data recovery (PLL) function 1173. Upon data synchronization, the data packets 720 are extracted and unpacked at a rate of 1 Mbps or 2 Mbps, and sent to the tag data recovery and processing function 1177. The tag data recovery and processing function 1177 serves as a communications control function associated with the arbiter 225, shown in FIGS. 2 and 10. The tag data recovery and processing function 1177 also serves as a controller for the timing of a locking/unlocking of the window/gating function and PLL 1173 and a triggering of the TOA averaging function 1174.

Figure 12:
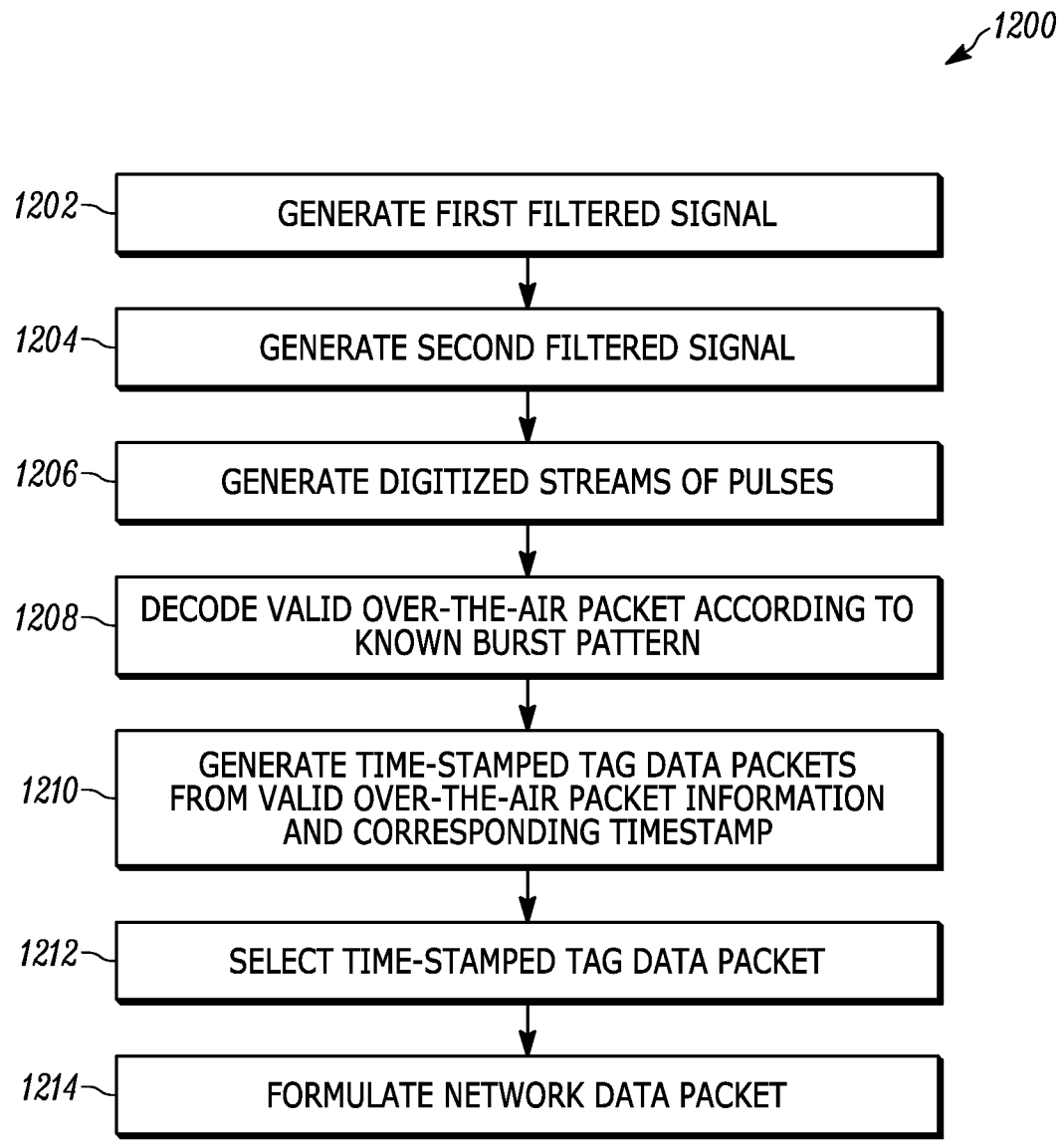
FIG. 12 is a flowchart representative of an example method implemented, in accordance with teachings of this disclosure.

FIG. 12 is a flowchart representative of an example method 1200 including operations performed by, for example, the example MSP 200 of FIG. 2. In the example method 1200, at block 1202, filter 205a generates a first filter signal by passing signal energy in a first radio frequency (RF) spectral band associated with a signaling bandwidth of an ultra-wideband (UWB) RF signaling system. At block 1204, filter 205b generates a second filtered signal by passing signal energy in a second RF spectral band associated with the signaling bandwidth of the UWB RF signaling system. At block 1206, detectors 215a and 215b generate a plurality of digitized streams of pulses, each respective digitized stream of pulses generated by identifying RF pulses in a respective filtered signal above a respective predetermined threshold. At block 1210, a plurality of packet decoders (e.g., 220a-b) generate at least one time-stamped tag data packet, wherein a respective time-stamped tag data packet is generated by decoding a valid over-the-air packet corresponding to a plurality of RF pulses received according to a known burst pattern at block 1208. The respective time-stamped tag data packet includes (i) information in the valid over-the-air packet and (ii) a corresponding timestamp. At block 1212, an arbiter 225 selects a time-stamped tag data packet from the at least one received time-stamped tag data packet. At block 1214, a packet formatter 235 formulates a network data packet based on the selected time-stamped tag data packet, and outputs the network data packet.

In some embodiments, the arbiter 225 sends a reset command to at least one of the plurality of packet decoders in response to the selection of the time-stamped tag data packet, for example, to prevent any of the packet decoders from processing duplicate packets.

In some embodiments, the arbiter 225 checks if the selected time-stamped tag data packet is a duplicate of at least one stored time-stamped tag data packet, and outputs a network data packet corresponding to the selected time-stamped tag data packet if the time-stamped tag data packet is not a duplicate.

In some embodiments, the first filter 205a has a RF spectral band of approximately all of the signaling bandwidth of the UWB RF signaling system, and the second filter 205b has a RF spectral band covering a portion of the RF spectral band of the first filter 205a, the RF spectral band of the second filter 205b attenuating signal energy in a RF spectral band of a known interfering system, as illustrated by the frequency spectrum of FIG. 4. In some embodiments, the first and the second filters 205a and 205b have non-overlapping RF spectral bands, the RF spectral bands of the first and second filters 205a and 205b collectively making up approximately all of the signaling bandwidth of UWB RF signaling system, as illustrated by the frequency spectrum of FIG. 5. In some embodiments, the first filter 205a and second filter 205b have RF spectral bands over approximately all of the signaling bandwidth of the UWB RF signaling system, as illustrated by the frequency spectrum of FIG. 6.

In some embodiments, the corresponding time stamp represents an average of counter values in the respective receiver for a plurality of detected RF pulses.

In some embodiments, the plurality of detectors 215a-b include comparators, each respective comparator configured to receive a respective filtered signal and a predetermined threshold $V_{TH}$ as inputs. Further, it should be noted that the detectors 215a-b may also include components for extracting modulation from the RF signal, such as square-law demodulators for creating baseband pulses out of the RF bursts, as well as amplification elements to amplify the baseband pulses prior to being received by the comparator.

In some embodiments, the first filtered signal is received from a first antenna, and the second filtered signal is received from a second antenna. In some embodiments, the first and second filtered signals are received from a common antenna.

Figure 13:
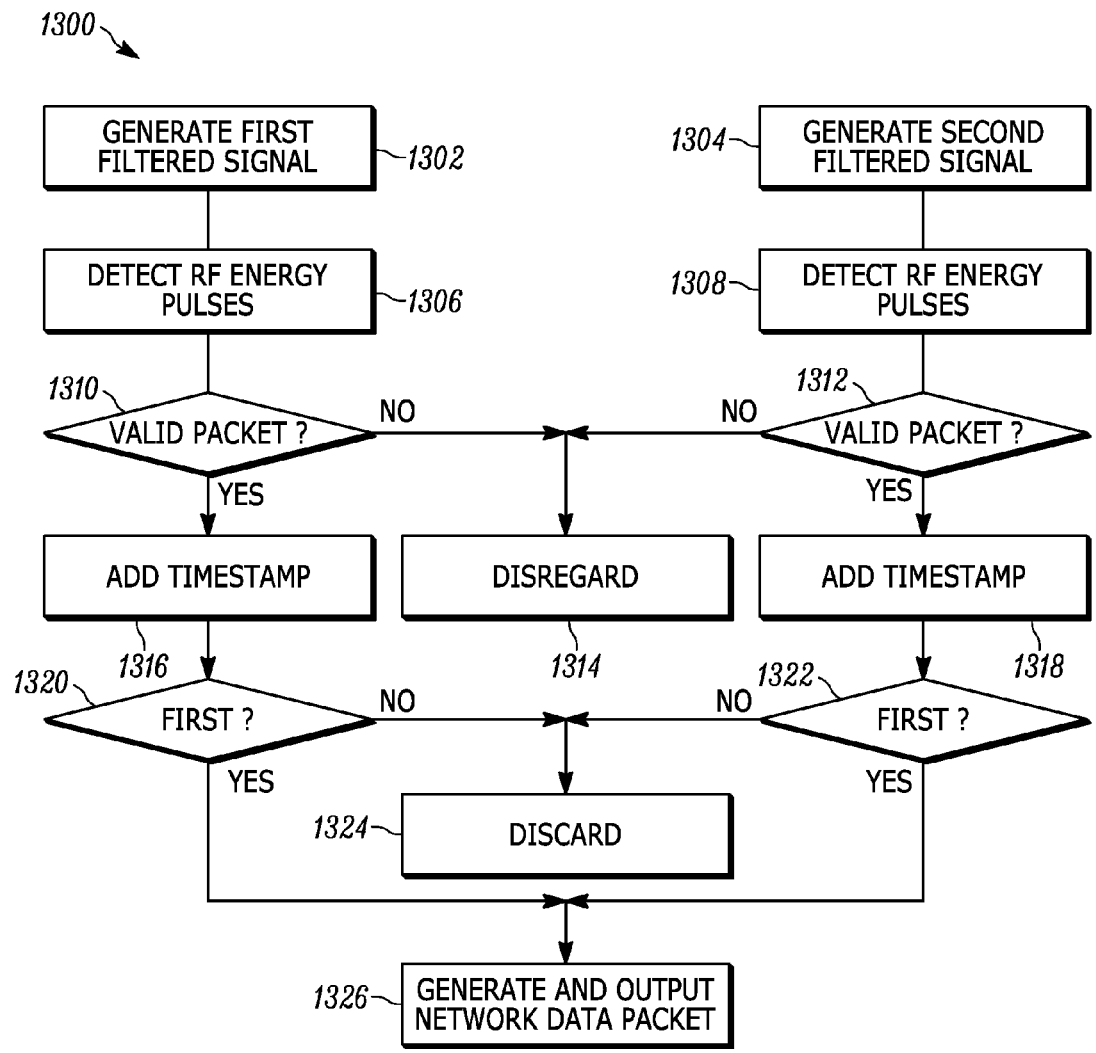
FIG. 13 is a flowchart representative of an example method implemented in accordance with teachings of this disclosure.

FIG. 13 illustrates a flowchart of a process 1300, in accordance with some embodiments. As shown in FIG. 13, first and second filtered signals are generated at steps 1302 and 1304, respectively using filters 205a and 205b. RF energy pulses are detected from each filtered signal at steps 1306 and 1308, respectively using detectors 215a and 215b. At steps 1310 and 1312, each detected stream of RF pulses is analyzed for a valid over-the-air packet using packet decoders 220a and 220b, using methods described above in connection with FIGS. 7-4. If a valid over-the-air packet is identified, a time-stamped tag data packet is generated using a respective packet decoder 220 at least in part based on information in the valid over-the-air packet and by adding a timestamp at 1316 and 1318. If no valid over-the-air packet is identified, then the current RF energy pulse is disregarded at 1314. At steps 1320 and 1322, an arbiter 225 receives each time-stamped tag data packet, and decides if the received time-stamped tag data packet is the first time seeing the received time-stamped tag data packet. In some examples, the arbiter 225 clears one or more packet decoders upon receiving a time-stamped tag data packet, while in alternative embodiments, the arbiter 225 retains a history of received time-stamped tag data packets, and compares any received time-stamped tag data packets against prior received time-stamped tag data packets using information such as based on tag IDs, etc. If it is the first time seeing the received time-stamped tag data packet, a network data packet is formulated and output from a packet formatter 235 at block 1326, the network packet formulated based on the received time-stamped tag data packet. If time-stamped tag data packet with the same tag ID has been received prior, the received packet may be discarded 1324.

Figure 15:
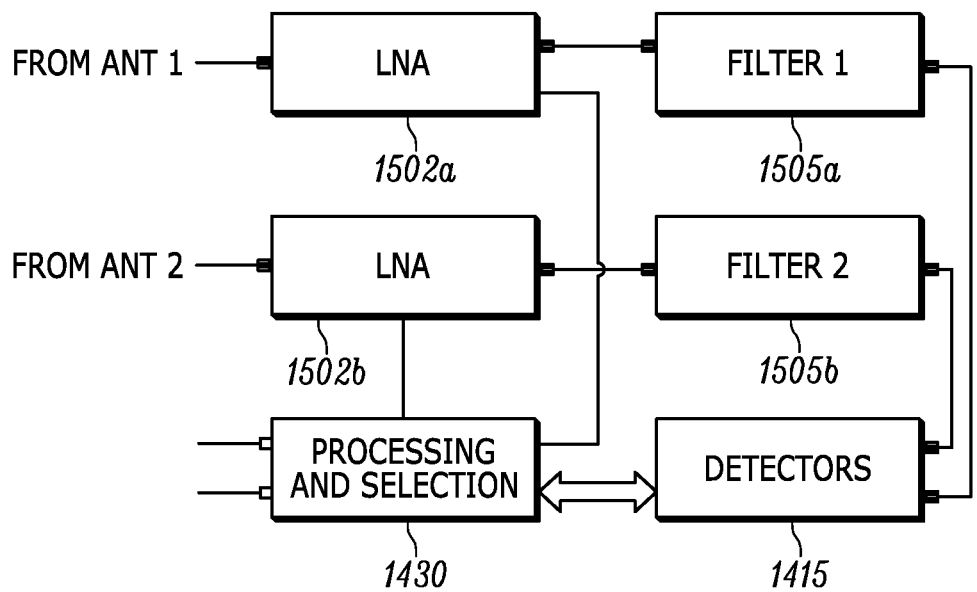
FIG. 15 is a second example receiver configuration constructed in accordance with teachings of this disclosure.

FIGS. 14 and 15 illustrate two configurations of a receiver 113, in accordance with some embodiments. As shown, FIG. 14 includes a low-noise amplifier (LNA) 1402, receiving a signal from antenna ANT1. The analog signal is separately filtered using first and second filters 1405a and 1405b, and passed to detectors 1415, which pass digital streams of detected RF pulses for packet processing, selection, and formatting 1430. It should be noted that the components shown in FIGS. 14 and 15 may take a similar form as the components described with respect to FIG. 2, such as filters 205a-b, detectors 215a-b, and packet decoders 220, and processing and selection bock 1430 including arbiter 225 and packet formatter 235.

FIG. 15 illustrates an alternative configuration of a receiver with respect to FIG. 14. As shown, FIG. 15 includes two LNAs 1502a and 1502b, receiving signals from separate antennas ANT1 and ANT2, respectively. First filter 1505a receives a signal from LNA 1502a and produces a first filtered signal while second filter 1505b receives a signal from LNA 1502b, and produces a second filtered signal. The signals are then detected 1415 and processed/selected 1430 in similar ways described above with respect to FIGS. 2, 10-11. In some embodiments, the configuration shown in FIG. 15 may have similar filter passbands as described with respect to FIGS. 4-5.

Figure 16:
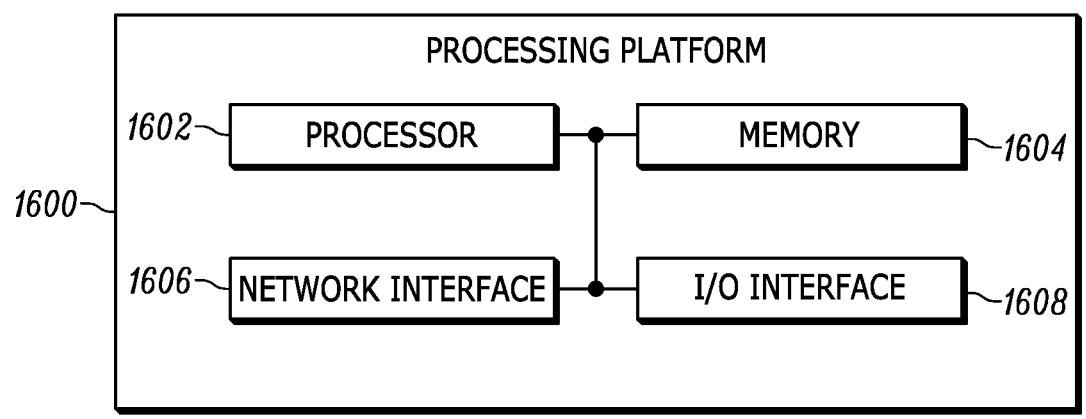
FIG. 16 is a block diagram representative of an example logic circuit capable of implementing example methods and apparatus disclosed herein.

FIG. 16 is a block diagram representative of an example logic circuit that may utilized to implement, for example, one or more components of the example MSP 200 of FIG. 2 or, more generally, the example receiver 113 of FIG. 10. The example logic circuit of FIG. 16 is a processing platform 1600 capable of executing instructions to, for example, implement the example operations represented by the flowcharts of the drawings accompany this description.

The example processing platform 1600 of FIG. 16 includes a processor 1602 such as, for example, one or more microprocessors, controllers, field-programmable gate arrays (FPGA) and/or any suitable type of processor. The example processing platform 1600 of FIG. 16 includes memory (e.g., volatile memory, non-volatile memory) 1604 accessible by the processor 1602 (e.g., via a memory controller). The example processor 1602 interacts with the memory 1604 to obtain, for example, machine-readable instructions stored in the memory 1604 corresponding to, for example, the operations represented by the flowcharts of this disclosure. Additionally or alternatively, machine-readable instructions corresponding to the example operations of the flowcharts may be stored on one or more removable media (e.g., a compact disc, a digital versatile disc, removable flash memory, etc.) that may be coupled to the processing platform 1600 to provide access to the machine-readable instructions stored thereon.

The example processing platform 1600 of FIG. 16 includes a network interface 1606 to enable communication with other machines via, for example, one or more networks. The example network interface 1606 includes any suitable type of communication interface(s) (e.g., wired and/or wireless interfaces) configured to operate in accordance with any suitable protocol(s).

The example processing platform 1600 of FIG. 16 includes input/output (I/O) interfaces 1608 to enable receipt of user input and communication of output data to the user.

The above description refers to block diagrams of the accompanying drawings. Alternative implementations of the examples represented by the block diagrams include one or more additional or alternative elements, processes and/or devices. Additionally or alternatively, one or more of the example blocks of the diagrams may be combined, divided, re-arranged or omitted. Components represented by the blocks of the diagrams are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations represented by the flowcharts of this disclosure). Some example logic circuits are hardware that executes machine-readable instructions to perform operations (e.g., one or more of the operations represented by the flowcharts of this disclosure). Some example logic circuits include a combination of specifically configured hardware and hardware that executes machine-readable instructions.

The above description refers to flowcharts of the accompanying drawings. The flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations represented by the flowcharts are implemented by machine-readable instructions (e.g., software and/or firmware) stored on a medium (e.g., a tangible machine-readable medium) for execution by one or more logic circuits (e.g., processor(s)). In some examples, the operations represented by the flowcharts are implemented by one or more configurations of one or more specifically designed logic circuits (e.g., ASIC(s)). In some examples the operations of the flowcharts are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) can be stored. Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

As used herein, each of the terms "tangible machine-readable medium," "non-transitory machine-readable medium" and "machine-readable storage device" is expressly defined as a storage medium on which machine-readable instructions are stored for any suitable duration of time (e.g., permanently, for an extended period of time (e.g., while a program associated with the machine-readable instructions is executing), and/or a short period of time (e.g., while the machine-readable instructions are cached and/or during a buffering process)).

Although certain example apparatus, methods, and articles of manufacture have been disclosed herein, the scope of coverage of this patent is not limited thereto. On the contrary, this patent covers all apparatus, methods, and articles of manufacture fairly falling within the scope of the claims of this patent.

We claim:

1. An apparatus comprising:
a first filter configured to pass signal energy in a first radio frequency (RF) spectral band associated with a signaling bandwidth of an ultra-wideband (UWB) RF signaling system, and to output a first filtered signal;
a second filter configured to pass signal energy in a second RF spectral band associated with the signaling bandwidth of the UWB RF signaling system, and to output a second filtered signal;
a plurality of detectors, each respective detector configured to receive a respective filtered signal and to output a digitized stream of pulses by identifying pulses in the filtered signal that are above a respective predetermined threshold;
a plurality of packet decoders, each respective packet decoder configured to receive a respective digitized stream of pulses and to decode a valid over-the-air packet corresponding to a plurality of RF pulses received according to a known burst pattern, and to generate a respective time-stamped tag data packet comprising (i) information in the valid over-the-air packet and (ii) a corresponding timestamp;
an arbiter in communication with the plurality of packet decoders, the arbiter configured to:
receive at least one time-stamped tag data packet from at least one of the plurality of packet decoders;
select a time-stamped tag data packet from the at least one received time-stamped tag data packet; and
a packet formatter configured to formulate a network data packet based on the selected time-stamped tag data packet, and to output the network data packet.

2. The apparatus of claim 1, wherein the arbiter is configured to send a reset command to at least one of the plurality of packet decoders in response to the selection of the time-stamped tag data packet.

3. The apparatus of claim 1, wherein the arbiter is further configured to check if the selected time-stamped tag data packet is a duplicate of at least one stored time-stamped tag data packet, and to generate and to output a network data packet corresponding to the selected time-stamped tag data packet if the time-stamped tag data packet is not a duplicate.

4. The apparatus of claim 1, wherein the first filter and second filter have RF spectral bands over approximately all of the signaling bandwidth of the UWB RF signaling system.

5. The apparatus of claim 1, wherein the first filter has a RF spectral band of approximately all of the signaling bandwidth of the UWB RF signaling system, and wherein the second filter has a RF spectral band covering a portion of the RF spectral band of the first filter, the RF spectral band of the second filter attenuating signal energy in a RF spectral band of a known interfering system.

6. The apparatus of claim 5, wherein the RF spectral band of the first filter is approximately 6.35-6.75 Gigahertz (GHz), the RF spectral band of the second filter is approximately 6.55-6.75 GHz, and wherein the RF spectral band of the known interfering system is approximately 6.425-6.525 GHz.

7. The apparatus of claim 1, wherein the first and the second filters have non-overlapping RF spectral bands, the RF spectral bands of the first and second filters collectively making up approximately all of the signaling bandwidth of UWB RF signaling system.

8. The apparatus of claim 7, wherein the first RF spectral band is approximately 6.35-6.525 Gigahertz (GHz), and wherein the second RF spectral band is approximately 6.55-6.75 GHz, and wherein an interfering system has an RF spectral band in either the first or second RF spectral band.

9. The apparatus of claim 1, wherein the corresponding time stamp represents an average of counter values in the respective receiver for a plurality of detected RF pulses.

10. The apparatus of claim 1, wherein each detector comprises a comparator configured to receive the respective filtered signal and the respective predetermined threshold as inputs, and to output the digitized stream of pulses.

11. A method comprising:
generating a first filtered signal by passing signal energy in a first radio frequency (RF) spectral band associated with a signaling bandwidth of an ultra-wideband (UWB) RF signaling system;
generating a second filtered signal by passing signal energy in a second RF spectral band associated with the signaling bandwidth of the UWB RF signaling system;
generating, using a plurality of detectors, a plurality of digitized streams of pulses, each respective digitized stream of pulses generated by identifying RF pulses in a respective filtered signal above a respective predetermined threshold;
generating, using a plurality of packet decoders, at least one time-stamped tag data packet, wherein a respective time-stamped tag data packet is generated based on decoding a valid over-the-air packet corresponding to a plurality of RF pulses received according to a known burst pattern, the respective time-stamped tag data packet comprising (i) information in the valid over-the-air packet and (ii) a corresponding timestamp;
receiving, at an arbiter in communication with the plurality of packet decoders, the at least one time-stamped tag data packet from at least one of the plurality of packet detectors;
selecting a time-stamped tag data packet from the at least one received time-stamped tag data packet;
formulating, using a packet formatter, a network data packet based on the selected time-stamped tag data packet; and
outputting the network data packet.

12. The method of claim 11, further comprising sending a reset command to at least one of the plurality of packet decoders in response to the selection of the time-stamped tag data packet.

13. The method of claim 11, wherein the method further comprises checking if the selected time-stamped tag data packet is a duplicate of at least one stored time-stamped tag data packet, and outputting a network data packet corresponding to the selected time-stamped tag data packet if the time-stamped tag data packet is not a duplicate.

14. The method of claim 11, wherein the first filter and second filter have RF spectral bands over approximately all of the signaling bandwidth of the UWB RF signaling system.

15. The method of claim 11, wherein the first filter has a RF spectral band of approximately all of the signaling bandwidth of the UWB RF signaling system, and wherein the second filter has a RF spectral band covering a portion of the RF spectral band of the first filter, the RF spectral band of the second filter attenuating signal energy in a RF spectral band of a known interfering system.

16. The method of claim 15, wherein the RF spectral band of the first filter is approximately 6.35-6.75 Gigahertz (GHz), the RF spectral band of the second filter is approximately 6.55-6.75 GHz, and wherein the RF spectral band of the known interfering system is approximately 6.425-6.525 GHz.

17. The method of claim 11, wherein the first and the second filters have non-overlapping RF spectral bands, the RF spectral bands of the first and second filters collectively making up approximately all of the signaling bandwidth of UWB RF signaling system.

18. The method of claim 17, wherein the first RF spectral band is approximately 6.35-6.525 Gigahertz (GHz), and wherein the second RF spectral band is approximately 6.55-6.75 GHz, and wherein an interfering system has an RF spectral band in either the first or second RF spectral band.

19. The method of claim 11, wherein the corresponding time stamp represents an average of counter values in the respective receiver for a plurality of detected RF pulses.

20. The method of claim 11, wherein the plurality of detectors are comparators, each respective comparator configured to receive a respective filtered signal and a predetermined threshold as inputs.

* * * * *